United States Patent [19]

Meador, III et al.

[11] Patent Number: 5,638,425
[45] Date of Patent: Jun. 10, 1997

[54] AUTOMATED DIRECTORY ASSISTANCE SYSTEM USING WORD RECOGNITION AND PHONEME PROCESSING METHOD

[75] Inventors: Frank E. Meador, III, Eldersburg; Kathleen M. Casey, Rockville, both of Md.; James E. Curry, Herndon, Va.; Alexander I. McAllister, Wheaton; Robert C. Tressler, Dunkirk, both of Md.; James B. Hayden, III, Burke, Va.; John P. Hanle, Silver Spring, Md.

[73] Assignee: Bell Atlantic Network Services, Inc., Arlington, Va.

[21] Appl. No.: 333,988

[22] Filed: Nov. 2, 1994

Related U.S. Application Data

[63] Continuation-in-part of Ser. No. 992,207, Dec. 17, 1992, abandoned.

[51] Int. Cl.[6] .............................. H04M 1/64; G10L 5/00
[52] U.S. Cl. ........................ 379/88; 379/89; 379/201; 395/2.4; 395/2.45; 395/2.6; 395/2.79
[58] Field of Search ................................ 379/67, 73, 88, 379/89, 201, 213; 381/41, 43; 395/2.4, 2.41, 2.45, 2.6, 2.65, 2.61, 2.79

[56] References Cited

U.S. PATENT DOCUMENTS

| | | | |
|---|---|---|---|
| 3,928,724 | 12/1975 | Byram et al. | 395/2.84 |
| 4,164,025 | 8/1979 | Dubnowski et al. | 364/419.12 |
| 4,394,538 | 7/1983 | Warren et al. | 381/43 |
| 4,608,460 | 8/1986 | Carter et al. | 379/71 |
| 4,797,910 | 1/1989 | Daudelin | 379/67 |
| 4,959,855 | 9/1990 | Daudelin | 379/213 |
| 4,979,206 | 12/1990 | Padden et al. | 379/67 |
| 5,052,038 | 9/1991 | Shepard | 379/88 |
| 5,163,083 | 11/1992 | Dowden et al. | 379/88 |
| 5,179,624 | 1/1993 | Amano et al. | 395/2 |
| 5,181,237 | 1/1993 | Dowden et al. | 379/88 |
| 5,315,689 | 5/1994 | Kanazawa et al. | 395/2.47 |
| 5,390,278 | 2/1995 | Gupta et al. | 395/2.52 |
| 5,425,129 | 6/1995 | Garman et al. | 395/2.65 |
| 5,479,488 | 12/1995 | Lennig et al. | 379/67 |
| 5,502,791 | 3/1996 | Nishimura et al. | 395/2.65 |

OTHER PUBLICATIONS

"Telephone Speech Recognition Using a Hybrid Method", Y. Takebayashi et al., International Conference of Pattern Recognition, IEEE, pp. 1232–1235, Dec. 1989.

*Primary Examiner*—Thomas W. Brown
*Assistant Examiner*—Scott L. Weaver
*Attorney, Agent, or Firm*—Lowe, Price, LeBlanc & Becker

[57] ABSTRACT

A mechanized directory assistance system for use in a telecommunications network includes multiple speech recognition devices comprising a word recognition device, a phoneme recognition device, and an alphabet recognition device. Also provided is a voice processing unit and a computer operating under stored program control. A database is utilized which may comprise the same database as used for operator directory assistance. The system operates as follows: A directory assistance caller is prompted to speak the city or location desired. The response is digitized and simultaneously inputted to the word and phoneme recognition devices which each output a translation signal plus a probability level signal. These are compared and the highest probability level translation is selected. The caller is prompted to speak the name of the sought party. The response is processed in the same manner as the location word. In the event that the probability level fails to meet a predetermined standard the caller is prompted to spell all or part of the location and/or name. The resulting signal is inputted to the alphabet device. When translations are obtained having a satisfactory probability level the database is accessed. If plural listings are located these are articulated and the caller is prompted to respond affirmatively or negatively as to each. When a single directory number has been located a signal is transmitted to the caller to articulate this number. The system also includes provision for DTMF keyboard input in aid of the spelling procedure.

25 Claims, 12 Drawing Sheets

| CANDITATE CITY (WORD-RECOGNIZER) | W-SCORE (WORD RECOGNIZER CONFIDENCE) | THE RECOGNIZED PHONEME STRING | STANDARD PHONEME STRINGS (FOR EACH CITY, THE "LABEL" STRING IS LISTED FIRST) | C-SCORE (PHONEME CONFIDENCE) | JOINT CONFIDENCE |
|---|---|---|---|---|---|
| WINCHESTER | 0.19 | WINCHUWSK(ER) | WINCHEST(ER) | 0.85 | 0.64 |
|  |  |  | WUNCHEST(ER) | 0.72 | 0.51 |
| WINKLESEA | 0.38 |  | WINKLSE | 0.55 | 0.45 |
|  |  |  | WUHNLSE | 0.23 | 0.26 |
| WESTCHESTER | 0.19 |  | WEHSTCHST(ER) | 0.14 | 0.17 |

FIG. 8

Fitting a Joint Confidence-Figure Function

Table A: Frequency (proportion of cases):

| C-Score (phoneme conf.): | | | | | | | | | |
|---|---|---|---|---|---|---|---|---|---|
| FROM | 0.2 | 0.3 | 0.4 | 0.5 | 0.6 | 0.7 | 0.8 | 0.9 | |
| TO | 0.3 | 0.4 | 0.5 | 0.6 | 0.7 | 0.8 | 0.9 | 1.0 | |
| W-score (Word-confidence) | | | | | | | | | |
| FROM | TO | | | | | | | | |
| 0.2 | 0.3 | 0.002 | 0.004 | 0.006 | 0.010 | 0.009 | 0.006 | 0.005 | 0.002 |
| 0.3 | 0.4 | 0.005 | 0.011 | 0.017 | 0.022 | 0.018 | 0.016 | 0.009 | 0.006 |
| 0.4 | 0.5 | 0.007 | 0.017 | 0.024 | 0.028 | 0.029 | 0.021 | 0.018 | 0.006 |
| 0.5 | 0.6 | 0.010 | 0.019 | 0.029 | 0.043 | 0.046 | 0.032 | 0.022 | 0.009 |
| 0.6 | 0.7 | 0.009 | 0.021 | 0.029 | 0.039 | 0.045 | 0.027 | 0.020 | 0.008 |
| 0.7 | 0.8 | 0.006 | 0.015 | 0.022 | 0.034 | 0.036 | 0.023 | 0.016 | 0.006 |
| 0.8 | 0.9 | 0.005 | 0.009 | 0.017 | 0.019 | 0.018 | 0.014 | 0.009 | 0.004 |
| 0.9 | 1.0 | 0.002 | 0.004 | 0.008 | 0.008 | 0.010 | 0.008 | 0.004 | 0.002 |

FIG. 11B

Table B: Prob(Correct choice of City), i.e "Joint Confidence Figure"

| C-Score (phoneme conf.): | | | | | | | | | |
|---|---|---|---|---|---|---|---|---|---|
| FROM | 0.2 | 0.3 | 0.4 | 0.5 | 0.6 | 0.7 | 0.8 | 0.9 | |
| TO | 0.3 | 0.4 | 0.5 | 0.6 | 0.7 | 0.8 | 0.9 | 1.0 | |

W-score (Word-confidence)

| FROM | TO | | | | | | | | |
|---|---|---|---|---|---|---|---|---|---|
| 0.2 | 0.3 | 0.193 | 0.269 | 0.300 | 0.346 | 0.388 | 0.438 | 0.499 | 0.539 |
| 0.3 | 0.4 | 0.246 | 0.336 | 0.368 | 0.467 | 0.444 | 0.622 | 0.863 | 0.596 |
| 0.4 | 0.5 | 0.297 | 0.394 | 0.464 | 0.446 | 0.520 | 0.571 | 0.709 | 0.685 |
| 0.5 | 0.6 | 0.367 | 0.448 | 0.527 | 0.497 | 0.550 | 0.700 | 0.751 | 0.731 |
| 0.6 | 0.7 | 0.460 | 0.459 | 0.580 | 0.616 | 0.657 | 0.762 | 0.744 | 0.830 |
| 0.7 | 0.8 | 0.449 | 0.531 | 0.564 | 0.650 | 0.784 | 0.908 | 0.918 | 0.893 |
| 0.8 | 0.9 | 0.552 | 0.607 | 0.669 | 0.670 | 0.812 | 0.827 | 0.941 | 0.933 |
| 0.9 | 1.0 | 0.608 | 0.651 | 0.789 | 0.810 | 0.852 | 0.911 | 0.971 | 0.990 |

AUTOMATED DIRECTORY ASSISTANCE SYSTEM USING WORD RECOGNITION AND PHONEME PROCESSING METHOD

This is a Continuation-In-Part application of Ser. No. 07/992,207 filed Dec. 17, 1992, now abandoned.

TECHNICAL FIELD

This invention relates to telecommunications networks and more particularly to systems for automatic processing of directory assistance calls in such networks.

BACKGROUND AND PRIOR ART

Efficient telecommunications systems require an ability to provide users with telephone or directory numbers of subscribers in response to telephonic requests. Generally such information is obtained by dialing a directory assistance number (411) which results in connection to a directory assistance office which supplies the telephone number in response to a customer request for residence, business or government listing.

Many present day directory assistance systems use a computer-aided search arrangement. In such a system a customer places a call to an operator and gives the particulars of a request for a directory listing. The operator keys identifying data into a computer for locating directory listings. When the operator has found an apparently correct listing in a computer generated display the operator signals the identity of the correct listing in the display and disconnects from the directory assistance call. The listing is then automatically announced to the calling telephone customer.

Daudelin U.S. Pat. No. 4,797,910 issued Jan. 10, 1989 describes a proposal which is said to further reduce operator work time.

More recently there have been numerous proposals for effecting a greater degree of automation. An early example of such a proposed system is described in Byram et al. U.S. Pat. No. 3,928,724 issued Dec. 23, 1975.

The Byram et al. patent describes a voice actuated directory assistance system in which the user spells the last name of the subscriber whose telephone number is desired. The user dials the uniform directory assistance number (411), causing the telephone switching system to connect the telephone to an audio-digital interface system and causing a first prestored prompt to be provided to the user from system memory. This message instructs the user to spell letter-by-letter the last name of the subscriber whose telephone number is desired. Each time a letter of the subscriber's last name is spelled it is encoded into digital form and stored in a register. The computer compares the stored digital signals with the digital signals representing subscribers stored in its main memory, and each time there is a match causes the identification and telephone number of the subscriber to be stored in a first temporary memory and the number of such matches in reading through the entire main memory to be stored in a match counter.

A selected one of three recorded messages is then transmitted to the user with the selected message corresponding to one of four different situations. These situations are (1) one exact match between the user provided input and the stored addresses from the main memory of the computer; (2) no match; (3) more than one match and (4) one or more partial matches. If only one subscriber is found corresponding to the spelling of the last name the telephone number is provided by the computer to the audio-digital interface system which converts the digital signal received from the computer into an audio signal and transmits the audio signal to the telephone receiver held by the user. If no subscriber corresponding to the spelling of the name is found the user is so informed and asked to provide alternate spellings or to hang up the receiver.

Padden et al. U.S. Pat. No. 4,979,206 issued Dec. 18, 1990, describes an arrangement intended to minimize the speech recognition requirement. Thus this patent describes an arrangement relying upon alphabet and numbers only, i.e., zip code location and name and address spelling. Two embodiments are disclosed. In one embodiment the caller dials the regular directory assistance number such as 411 or 555-1212. The system then proceeds with the prompt and response dialogue until a directory number is located in the database. At this point the located number is orally delivered to the user. This methodology is illustrated in the flow charts of FIGS. 2–6 under the "Detect Regular DA Number" option referenced by the numeral 150 in FIG. 2.

The alternative embodiment involves a situation in which the caller desires the system to automatically complete the call. In this case the caller dials a special directory assistance code such as 311 or 555-1234. The system then proceeds through the same methodology with the added feature of call completion. This methodology is also illustrated in FIGS. 2–6 under the "Detect Special DA Number" referenced at 101.

U.S. Pat. No. 5,052,038 issued Sep. 24, 1991, describes a directory assistance request processor wherein the name of the subscriber whose telephone number is sought is entered through the use of standard DTMF push buttons using the grouped alphabetic designators on those buttons.

Carter et al. U.S. Pat. No. 4,608,460, issued Aug. 26, 1986, describes an automatic directory assistance apparatus and method which uses automated voice prompts to a caller in order to obtain an input identifying the called party. The user responds by utilizing DTMF signal inputs representing the first four letters of the last name and the initial of the first name of the desired party.

Dubnowski et al. U.S. Pat. No. 4,164,025 issued Aug. 7, 1979, describes an arrangement for recognizing words corresponding to a sequence of spelled input character signals.

The use of automated speech recognition devices to process spoken information received over telephone lines is well known and is becoming increasingly popular. If such automated speech recognition equipment is utilized it is important that the speaker communicate accurate information to the system with maximum machine assistance and minimum user inconvenience. For example it is desirable that the caller be prompted as few times as possible to repeat questionable information or to supply additional information to permit reaching a solution to the selection process.

Accordingly it is an object of this invention to provide automated directory assistance in a manner which is not only efficient but also acceptable and pleasing to the user.

It is another object of the invention to provide automated directory assistance using available speech recognition equipment in a unique manner to attain an improved level of effectiveness.

It is another object of the invention to provide automated directory assistance using available speech recognition devices in an improved manner to minimize the necessity to rely on operator intervention.

It is another object of the invention to provide automated directory assistance using multiple types of available speech recognition equipment to maximize the successful provision of the requested assistance without reliance upon operator intervention.

These and other objects and advantages of the invention will become more apparent upon reference to the following specification, drawings and claims.

DISCLOSURE OF THE INVENTION

According to the invention there is connected to a stored program control switch in a telecommunications network an automated directory assistance platform which includes multiple speech recognition devices. These preferably include a word recognition device, a speech recognition device capable of recognizing a predetermined word spoken within a plurality of spoken words, for example, a phoneme board, and an alphabet recognition device. Each of these devices is capable of decoding a digital speech input signal to provide a first output signal indicative of the sought word and a second output signal indicative of the level of probability in the accuracy of the word signified by the first output signal.

The word recognition and phoneme recognition devices are preferably used in parallel and are associated with a comparator and selector device which compares the outputted probability level signals produced by the same input to select and output the signal showing the highest probability level. A voice processing unit is included to store a series of predetermined voice messages and a voice synthesizer is provided. A directory database is included and may comprise the same directory database as is normally used in operator performed directory assistance. A computer operating under the control of a stored program controls the response and operation of the various devices in the manner now described:

A caller dialing a predetermined directory assistance number is connected to an automated directory assistance station. The voice processing unit thereupon instructs the caller with a stored message requesting the caller or user to speak the name of the location of the sought subscriber, such as "Washington", "Alexandria", "Bethesda", etc. The user's response is encoded into a signal compatible with the speech recognition devices and according to the preferred embodiment is inputted simultaneously to the word recognition device and the phoneme recognition device. Each of these devices decodes the signals received. For each name transmitted from the user to the voice processing unit, a plurality of candidate words are generated based upon similarity to the word uttered by the user. A confidence level or probability value is generated with respect to each of the candidate words. This probability value is indicative of the probability of the candidate word being correct with respect to the word uttered by the user. The probability value of the first word generated is compared to a predetermined threshold. If the probability value of the first candidate word is equal to or greater than the threshold value, the comparison process is terminated, and the candidate word is either sent to the user or applied to access a database to obtain corresponding information to be sent to the user.

If the first candidate word is not over the threshold value, additional candidate words are compared to threshold value. Either the first candidate word over the threshold value can be used to obtain the information to be sent to the user. In the alternative, all of the candidate words having probability values above that of the threshold level can be compared to obtain the highest probability level so that that word can be used either to be sent to the user or to obtain additional data to be sent to the user. Another approach is to generate a phoneme string or a plurality of phoneme strings for each of the candidate words. Each of the phoneme strings has its own probability value. A combined probability value for each of the candidate words and their associated phonemes can be calculated using a predetermined function so that a combined probability is calculated for each of the phonemes and its respective candidate word. The combination of candidate word and associated phoneme having the highest combined probability value is selected to be sent to the user or to be used to access a database to obtain associated information to be sent to the user. At any point in this process, the probability level can be checked against a threshold to determine if the value is sufficient for use or if additional selection must be carried out to find a more probable prospect for the correct word with respect to that uttered by the user. It has been determined that the combination of candidate word probability and phoneme string probability results in the most reliable prospect for the correct word with respect to that uttered by the user.

If the foregoing methodology fails to provide a probability level signal which reaches a preset minimum acceptance level, the voice processing unit transmits to the user a further prompt requesting the user to spell a portion or all of the name of the desired location. The response of the user is encoded into a signal compatible with the speech recognition equipment and is inputted to the alphabet recognition device. The alphabet recognition device outputs a decoded signal signifying the letter of the alphabet and a probability level signal. If the probability level meets the acceptance level the decoded signal is used to search the database as previously described. If the probability level fails to reach the acceptance level the voice processing unit transmits a further prompt to the user requesting the user to strike the DTMF key of the telephone associated with the letter which failed to produce a satisfactory acceptance level. The resulting signal from the DTMF keyboard is then encoded into a signal compatible with the database and this signal is used alone or in conjunction with signals outputted by the speech recognition devices to search the database to locate the location specified by the user.

If the search of the database locates multiple localities bearing similar prefixed names the computer causes the voice processing unit to transmit to the user a seriatim articulation of such names and requests the user to respond YES or NO with respect to each spoken location. Alternatively the user may be requested to indicate an affirmative or negative response by striking a designated key or keys of the DTMF keyboard.

Having located the appropriate section of the database the voice processing unit transmits to the user a pre-stored prompt requesting the user to speak the name of the sought party. This response is encoded into a signal compatible with the speech recognition devices and is provided as input to such devices. If the output of the word and phoneme recognition devices provides a satisfactory probability level signal the database is accessed in an attempt to locate the directory number. If the probability level is unsatisfactory the user is requested to follow the procedure of speaking and/or keying the alphabet spelling of the name in the same manner as described above. If the database search provides a single match and the directory number is located, the directory number is transmitted to the user in the same manner as now occurs with operator conducted directory assistance.

If the database search locates multiple names on the same street, the voice processing unit transmits to the user a signal requesting the user to speak another indicia of the address, such as the street number. This is thereupon processed in the manner above described to attempt to isolate a single match in the database. If no such match can be located the voice processing unit advises the user that the automatic processing is being terminated and either advises the user to access an operator or automatically causes connection to such an operator.

BRIEF DESCRIPTION OF DRAWINGS

FIG. 8 is a table depicting the relationship between word candidates and phoneme strings.

FIG. 11 and FIGS. 11A–11C are spreadsheets illustrating a least-square fitting of a confidence generating function.

BEST MODE FOR CARRYING OUT THE INVENTION

Figure 1:
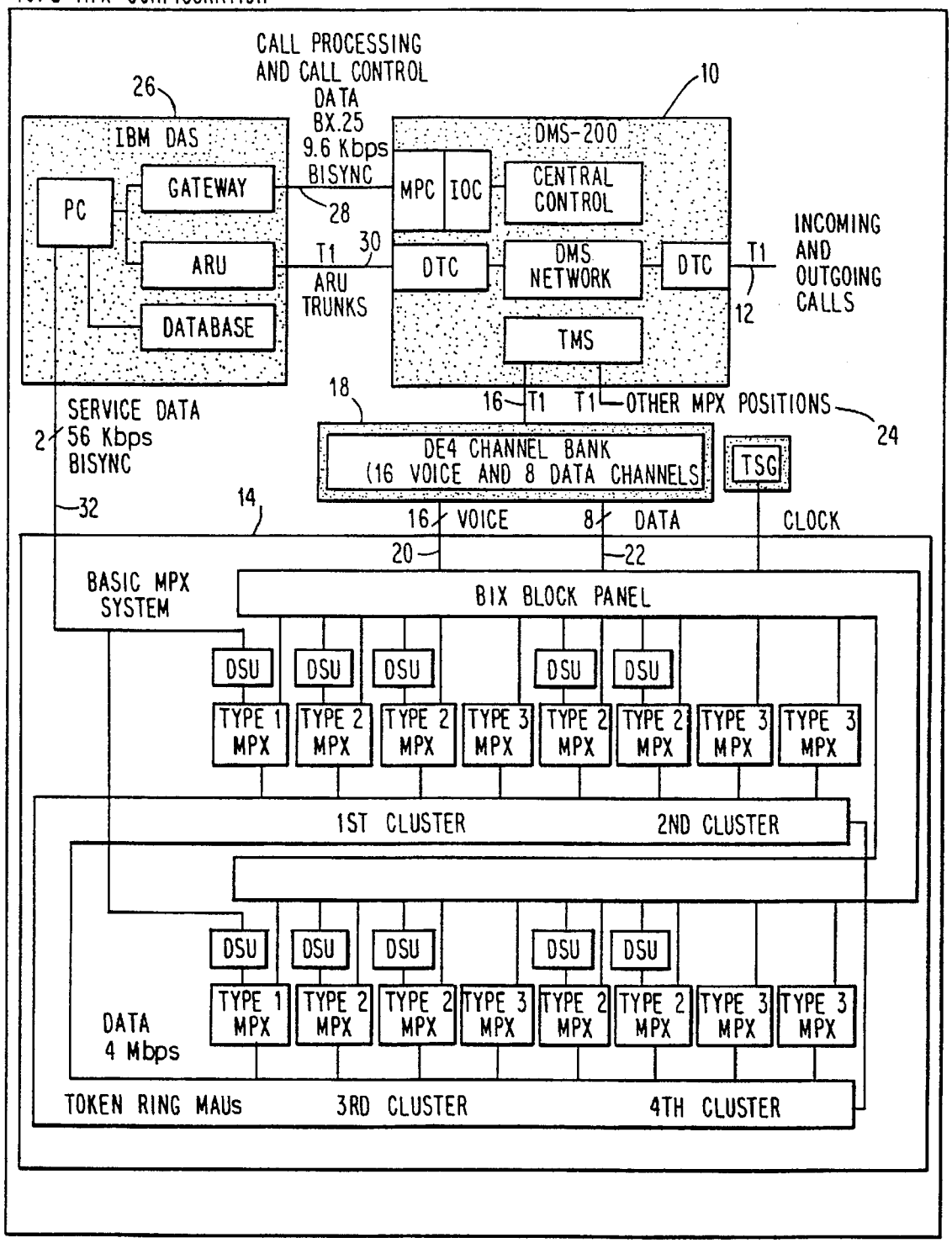
FIG. 1 is a block diagram illustrating a conventional directory assistance configuration for handling directory assistance or 411 calls.

Referring to FIG. 1 for purposes of background information, there is shown a conventional Traffic Operator Position System (TOPS) configuration for handling directory assistance or 411 calls. Referring to that figure there is shown at 10 a stored program control (SPC) switch, such as the Northern Telecom DMS-200 having within it the elements necessary for conventional SPC switch operation. The switch is shown symbolically connected to the network via a T1 line 12. The switch 10 is connected to directory assistance operator positions as typified by the basic MPX system indicated at 14. This connection is made via T1 line 16, DE4 channel bank 18 and voice and data links 20 and 22. The MPX position 14 is exemplary only and other MPX positions are connected by additional T1 lines indicated symbolically at 24. A directory assistance database (DAS) 26 is connected to the switch 10 by the indicated links 28 and 30 and is connected to the MPX system 14 by the indicated link 32. The DAS 26 is shown in FIG. 1 as an IBM DAS, by way of example.

Each T1 link, such as the link 16, carries 24 channels of which 16 are devoted to voice and 8 to data. These lines are shown after being split by the channel bank on links 20 and 22. The 16 voice channels are delivered to the 16 operator positions or MPXs in modules such as indicated by the numeral 14. The system of the invention is designed to permit the one-by-one replacement of the basic MPX modules such as 14.

Figure 2:
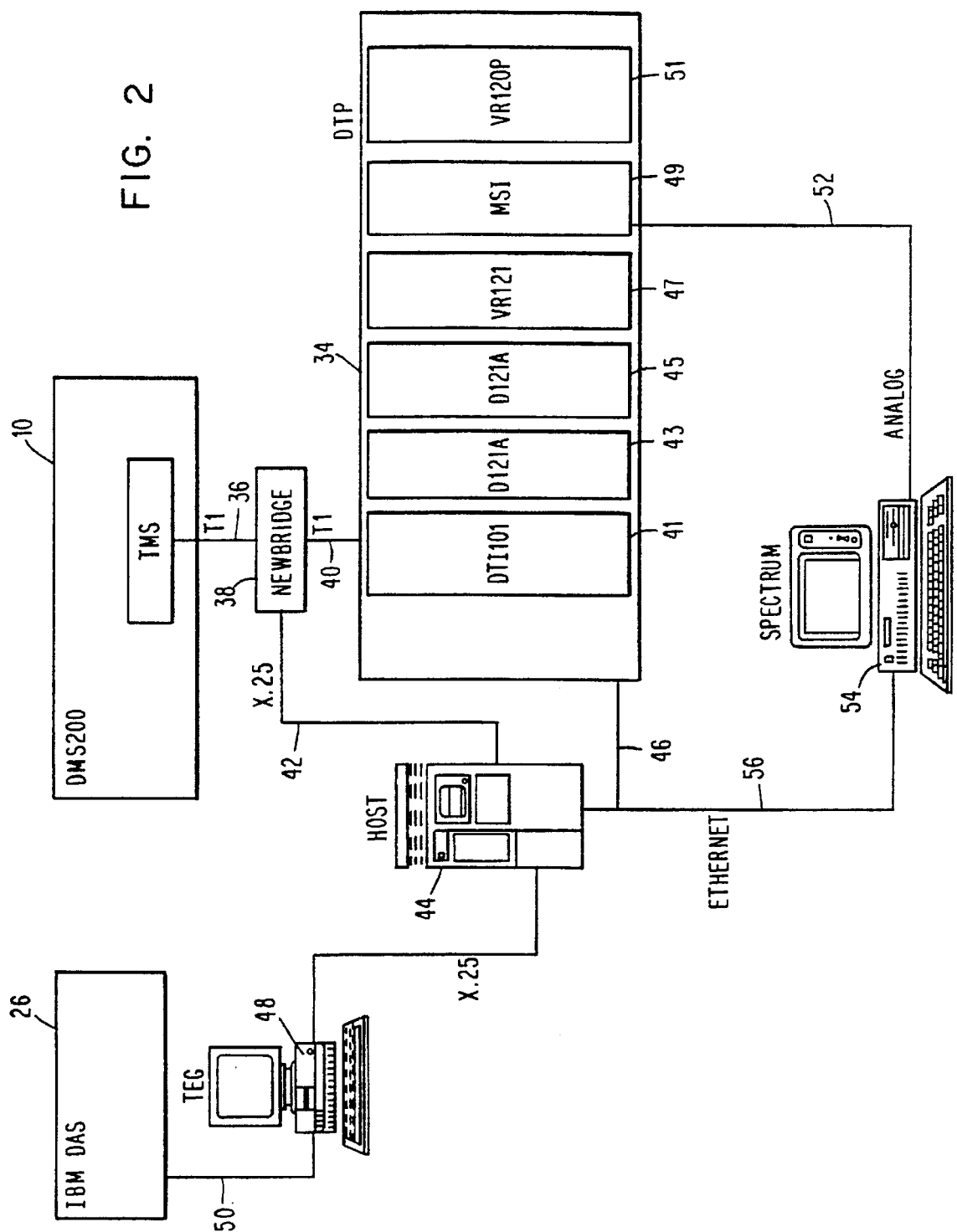
FIG. 2 is a block diagram showing the architecture of an arrangement for providing automated handling of directory assistance or 411 calls according to a preferred embodiment of the invention.

Referring to FIG. 2 there is seen a block diagram illustrating the replacement of one such MPX module with the automated arrangement of the invention. Referring to that figure the DMS-200 switch 10 of FIG. 1 is shown in simplified form identified by the same reference numeral. The database facility IBM DAS is again indicated by the numeral 26. Assuming gradual replacement of the conventional MPX modules, such as the module 14 in FIG. 1, those MPX modules remaining will be connected to the switch 10 and database 26 in the same manner as indicated in FIG. 1. This connection is not shown in FIG. 2 for purposes of clarity in illustrating the substituted automated position.

Referring to FIG. 2 an automated directory assistance system (MDAS) module 34 which includes or comprises a microcomputer, is connected to the switch 10 via a T1 link 36 and channel bank 38 which may, for example, be a Newbridge multiplexer. This unit separates the 24 channels of the T1 to 16 voice and 8 data channels connected to links 40 and 42. The data link 42 is connected to a host computer 44, such as the Motorola M8840-2B3 20 slot 8840 25 MHz. having a NDS-C (network display system color) 17-4 color monitor or equivalent system. The host computer 44 receives X.25 protocol data information over the link 42 and provides control to the MDAS 34 over link 46. The host 44 is also connected to the DAS database 26 via a Terminal Emulation Gateway (TEG) 48 and link 50.

The 8 data channels on link 42 provide the host 44 with information as to which of the 16 T1 channels on T1 link 40 carries the call and similar information. In the illustrative embodiment the MDAS module 34 comprises a computer or PCs which includes minimally a 386 CPU and may, for example, comprise a DTP Dialogic Telpak and/or an ICS Industrial Computer Source PC Model 8531-RM. Also included in the module 34 are a DTI 101 Digital Telephony Interface board 41, two D121A Dialogic Multi-Line Voice Communication System boards 43 and 45, a VR121 Voice Recognizer board 47, an MSI digital to analog interface board 49 and a Dialogic VR 120P board 51. An analog output of the MSI interface board is connected via link 52 to a Spectrum computer 54 containing a DSP 32C phoneme recognition or telephony board. The computer 54 is linked to the host 44 and MDAS module 34 via link 56 which may be an Ethernet link.

The various boards provide the prompts and announcements to the user and data to the controlling CPUs. The 101 board brings in the digital voice signal and feeds the two D121 boards. Two boards are needed in this embodiment inasmuch as the D121 boards each serve 12 channels and 16 channels are being utilized. The VR121 board is trainable and provides discrete word recognition. The board is used in this embodiment to recognize town or location words such as "Bethesda", "Arlington", "Alexandria", etc. The board is trained to recognize the names of the towns or locations local to the site of deployment of the MDAS 34. The VR120 board provides alphabet recognition. Thus the MDAS module and the computer 54 provide the capability of word, alphabet and phoneme recognition which is used in a manner to be described. It will be recognized that the per se provision of word, alphabet, and phoneme recognition individually can be accomplished by utilizing readily available commercial equipment designed for these purposes. The present invention resides in the combination represented by the platform of FIG. 2 and the manner of its use including the precise method of matching the words spoken by the system user.

In general, the present invention applies to selecting a city from a known list of cities, and using the city phone directory to obtain the number of a subscriber by repeating the technique.

The caller or user is instructed by system prompts to utter the name of the city to which he desires directory access. This utterance is stored in digital form in a file. The utterance can then be analyzed by one or two processes. The first process is a word-recognizer, that produces a list of three (or more) candidate cities, with confidence or probability figures, which are called W-scores. The probability figure is simply a shorthand phrase for the probability that a particular choice of a candidate word is correct. The second process is the use of a phoneme-recognizer. This produces a single "recognized phoneme string", which is stored in alphabetic (or more specifically, in ASCII) form.

If the first of the city-candidates from the word-recognizer has a probability value which is above some chosen threshold, we terminate the process, choose this city, and proceed with the rest of the directory inquiry. Suppose this is not the case.

Each candidate city is linked to a set of one (or more) "standard" phoneme strings, which have been stored in a reference file, again in alphabetic (ASCII) form. This set of standard phoneme strings is produced using one, or possibly, two methods:

The first, primary method produces precisely one string, which will be referred to as the "phoneme label string" for the referenced city candidate word, and is derived form the spelling of the city. This method is discussed in Section B.3.1, infra.

The second method produces one or more phoneme strings, using experimental utterances by a panel of typical speakers, and is described in Section B.3.2, infra. There may be two, or more of these strings, as different pronunciations may have been found in the community. We note that this second method is appropriate for an application where there is a limited number of names, for example cities. For a set of having a large number of names, or continually changing, such as business names, or last names, the second method may be inappropriate. The preferred embodiment of the present invention would preferably rely on the first method only. Reference in the following text to the "standard" strings would mean the single "label string" produced by the first process.

The relationship of candidate words and their associated phonemes is depicted in FIG. 8. The third column of the FIG. 8 table indicates that there is only one recognized phoneme string, which applies to the whole column with respect to word candidate. The "standard" stored phoneme string(s) for each candidate city are depicted in column 4.

In column 5 is contained the calculated probability, the "C-score", that each standard stored phoneme string (of column 4) was the one that the speaker was in fact uttering. The derivation and preliminary work for this calculation is given in Section B.5 through Section B.10. The W- and C-scores (columns 2 and 5) are combined to give a joint or combined probability value. The derivation and preliminary work for this are given in Part C, and a detailed example in Part D.

It is noted that the highest joint or combined probability value is 0.64, for the city "Winchester". Assuming this figure is above a chosen threshold, the system therefore chooses the name "Winchester". In similar situations (leading to approximate W- and C-scores of 0.19 and 0.85 respectively), the system chooses the correct city name about 64% of the time.

Figure 3:
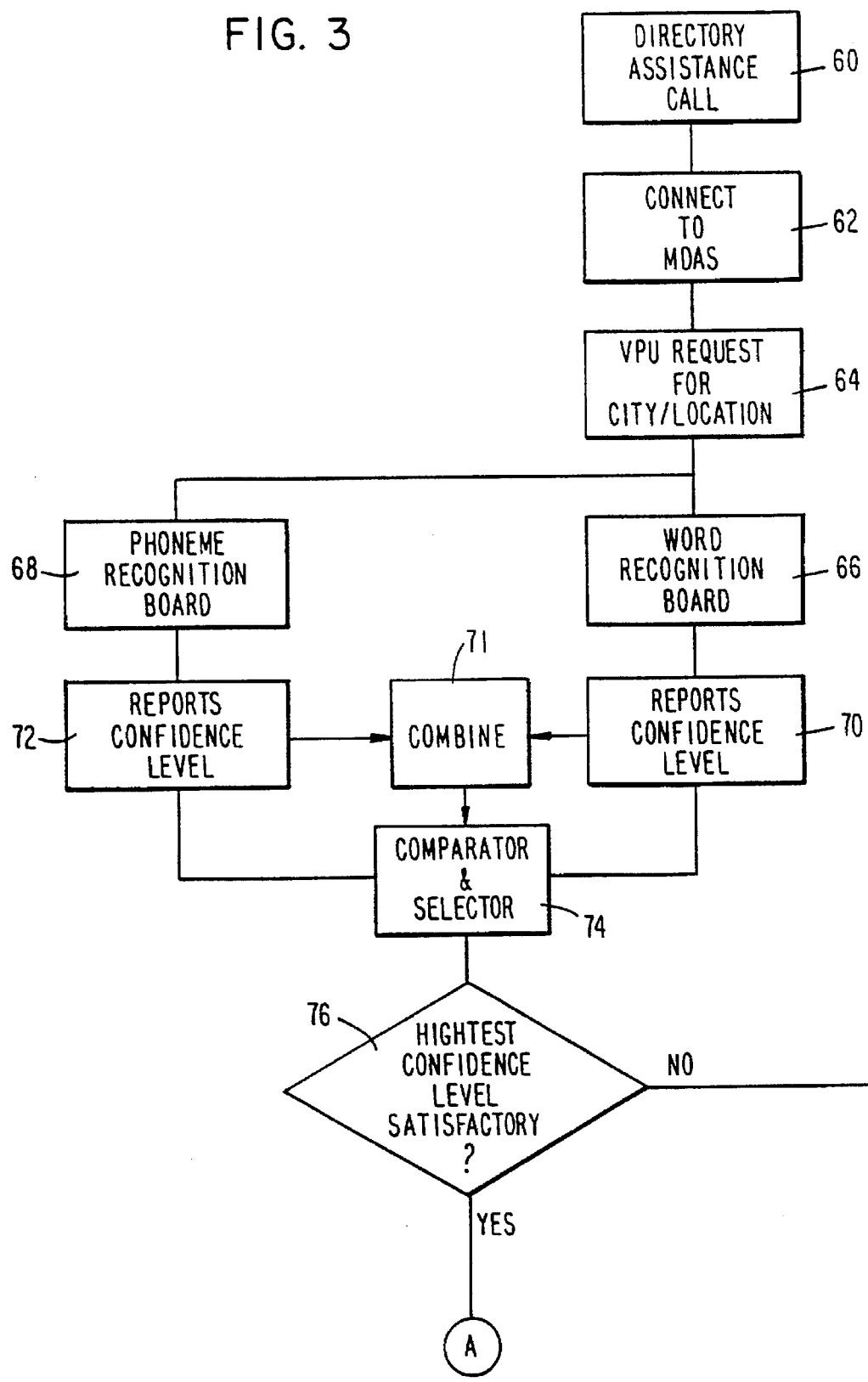
FIGS. 3–7 constitute a flow diagram illustrating the operation of the arrangement of FIG. 2 according to a preferred embodiment of the invention.

One embodiment of the operation of the system of FIG. 2 is illustrated in the flow diagram of FIGS. 3–7. Referring to FIG. 3 a user desiring directory assistance dials 411 at 60. The call is directed via the central office 10 and channel bank 38 to the MDAS 34 as indicated at 62. At the MDAS the caller is connected to the stored prompts or announcements or voice processing unit (VPU) including cards 43, 45. At 64 the VPU originates a request for the caller to speak the name of the city or location desired. The caller responds and this is directed at 66 to the word recognition board 47 and at 68 to the phoneme recognition board in the computer 54.

The word recognition board and the phoneme recognition board each provides a decoding or translation along with a probability level signal in the customary manner. It will be understood that more than two boards may be used if desired. The probability level reports for the preferred two boards are indicated at 70 and 72. The determination of the combined probability values is also determined at this point by carrying out the combination of the probability value of each word candidate with that of each of the phoneme strings associated with that word candidate in step 71, thereby resulting in a plurality of combined probability values for each word candidate, as described in greater detail, infra. (As indicated, supra, the probability level is equivalent to the confidence level which is indicative of a probability that a particular word candidate or phoneme string may be correct with respect to the word uttered by the user.)

At 74 these are fed to a comparator and selector of the type commonly referred to as a voter. The voter determines the higher of the two probability levels. This probability level is measured against a pre-set level of acceptance in a conventional manner and a decision is made at 76 as to whether the probability level for the selected translation is adequate or satisfactory to permit its use. If the decision at 76 is YES, the city or location has been determined and the MDAS is able to access the appropriate city/location database in search of the sought directory number.

Figure 4:
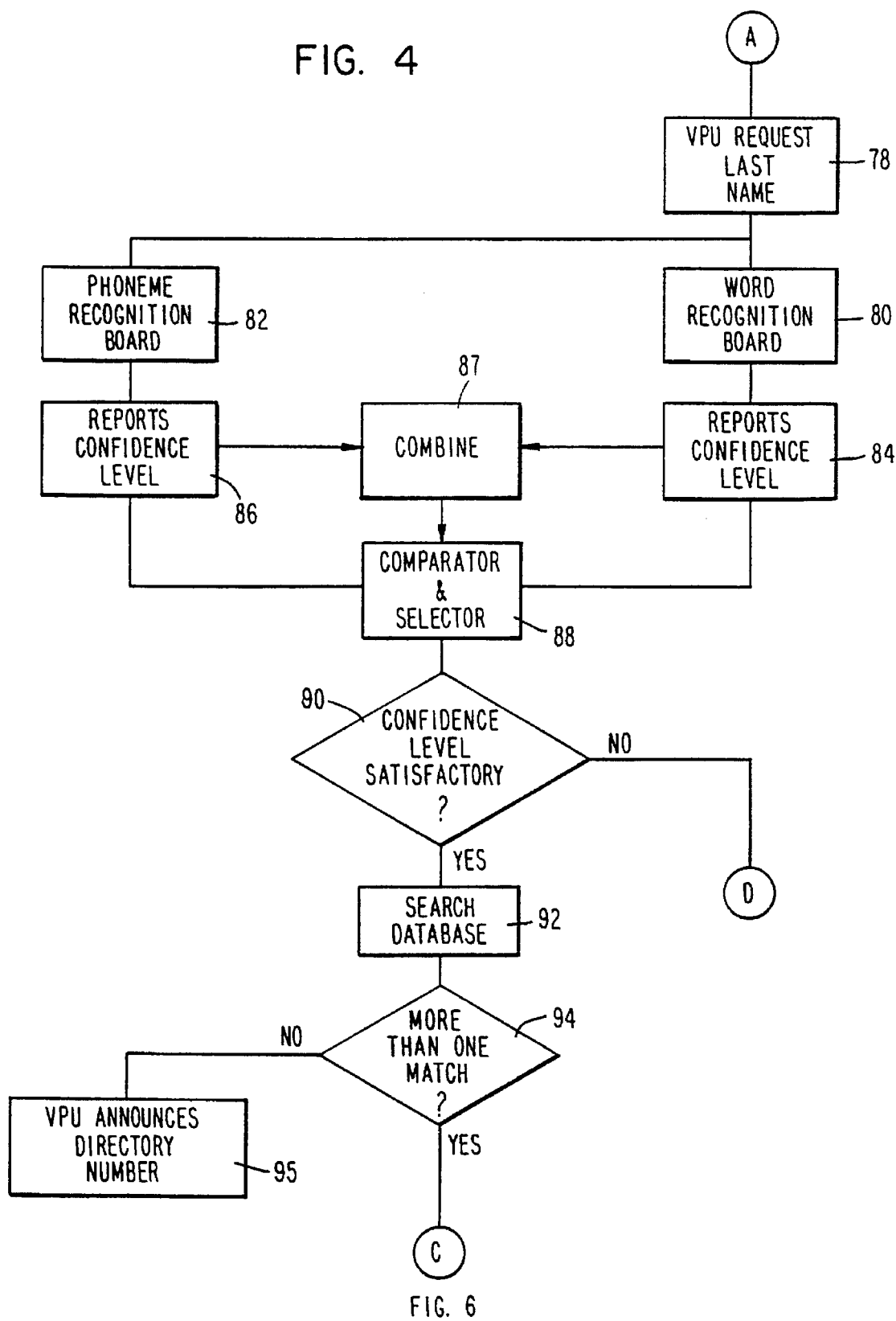

Referring to FIG. 4 the VPU at 78 next requests the user to speak the last name of the party whose directory number is sought. The caller responds and this is directed at 80 to the word recognition board and at 82 to the phoneme recognition board. The word recognition board and the phoneme recognition board each report a probability level at 84 and 86 and these are compared and a selection made in the voter as indicated at 88. Likewise, the combined probability levels as described, supra, are determined at this point in step 87. Further, if necessary, the highest combined probability level can be determined for comparison with the predetermined threshold in voter 88. At 90 a decision is made as to whether or not the probability level of the selected signal is satisfactory. If the probability level is satisfactory the MDAS searches the previously located database at 92. At 94 a determination is made as to whether or not there is more than one match for the specified last name.

If there is only a single match the desired directory number has been located and the VPU announces this to the user at 95. At this point the automated directory assistance function has been completed.

Figure 5:
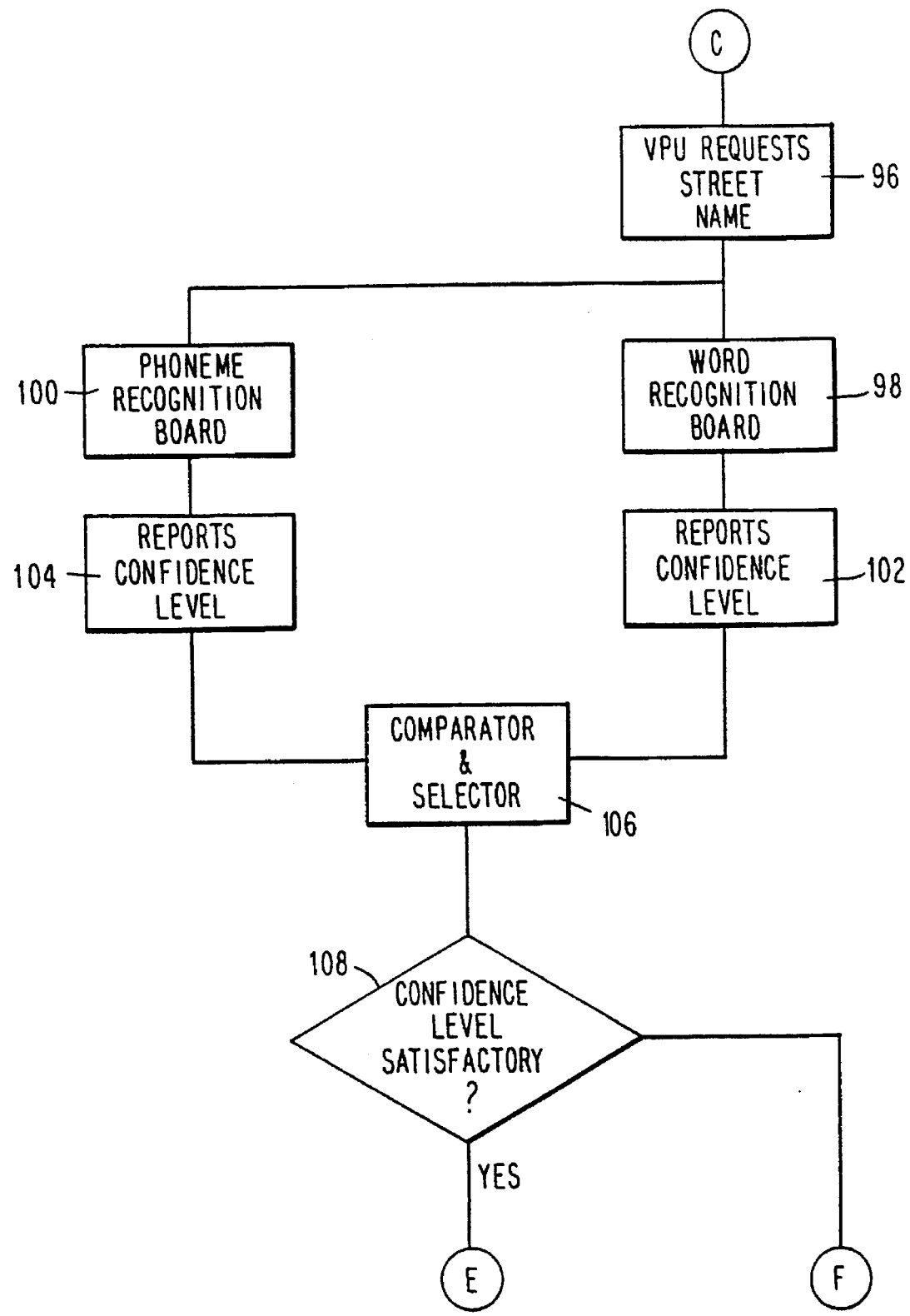
Figure 6:
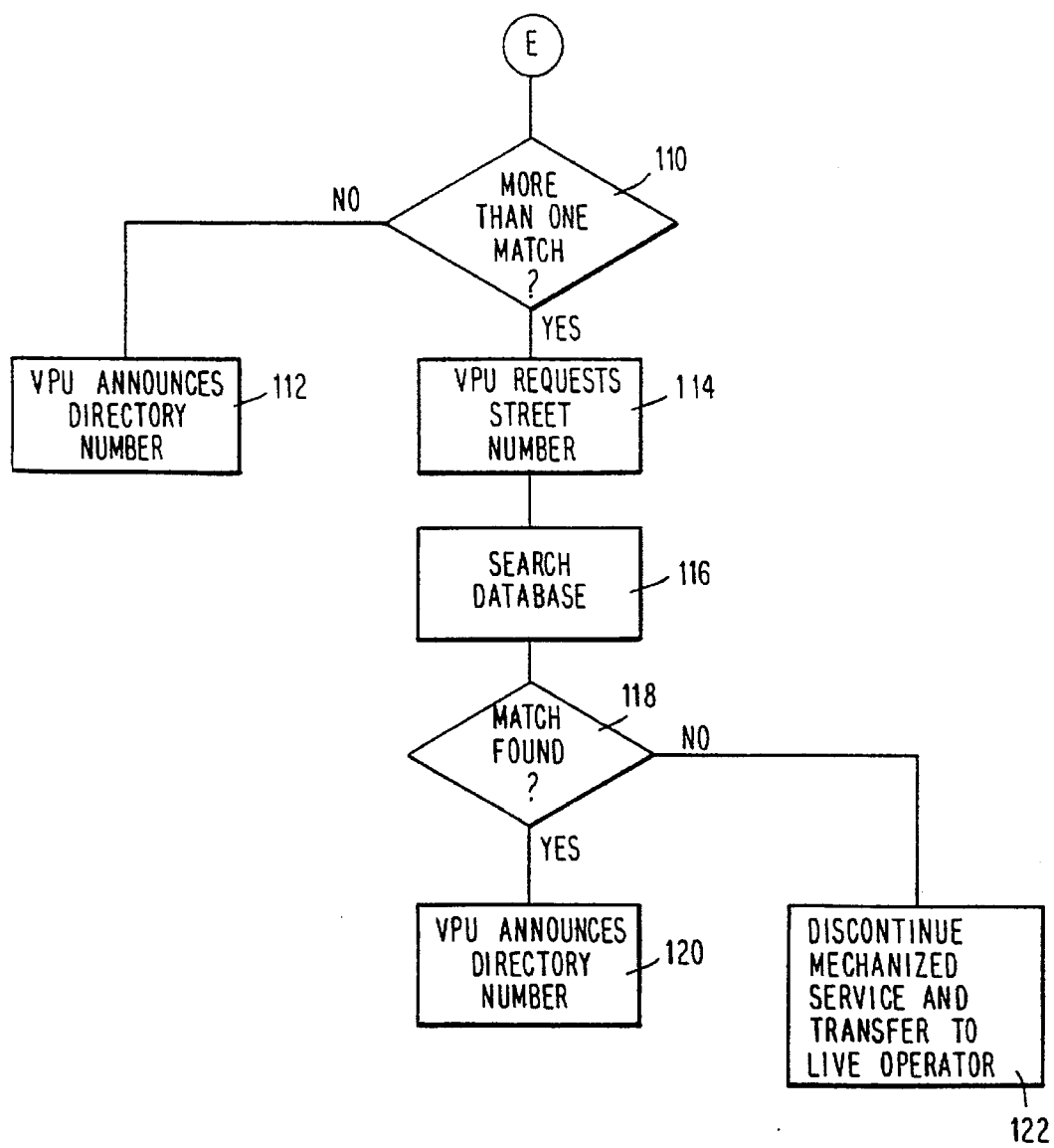

If the determination at 94 indicates that there is more than one match for the last name, the VPU at 96 in FIG. 5 requests the user to speak the street name. The user's response is directed at 98 to the word recognition board and at 100 to the phoneme recognition board. The probability levels of these two boards are reported at 102 and 104 and these are compared and a selection made at 106. The probability value can either be that for a single word candidate or a plurality of word candidates. Also, a combined probability value can be determined for each of the word candidates using either one phoneme string for each word candidate to produce only one combined probability value, or by using a plurality of phoneme strings for each word candidate to produce a plurality of combined probability values for each word candidate. The techniques for producing these combined probability values, and the algorithm used for making the combination are described, infra. At 108 a determination is made as to whether the probability level for the selected translation is satisfactory. If the probability level is satisfactory a determination is made at 110 in FIG. 6 as to whether or not there is more than one match. If only a single match has been located the desired directory number has been found and the VPU makes such an announcement to the user at 112 and the automated directory assistance function has been completed.

If more than one match is found the VPU next requests the user to speak the street number at 114. The MDAS thereupon searches the database at 116 and at 118 a determination is made as to whether a single match has been found. If a single match has been found the desired directory number has been located and the VPU announces the directory number at 120. If no match is located one of several conditions may exist. The directory number may be unlisted or unpublished or information supplied by the user may be in error. The automated service is discontinued at 122 and the VPU makes an announcement to the user and refers or connects the user to an operator.

Figure 7:
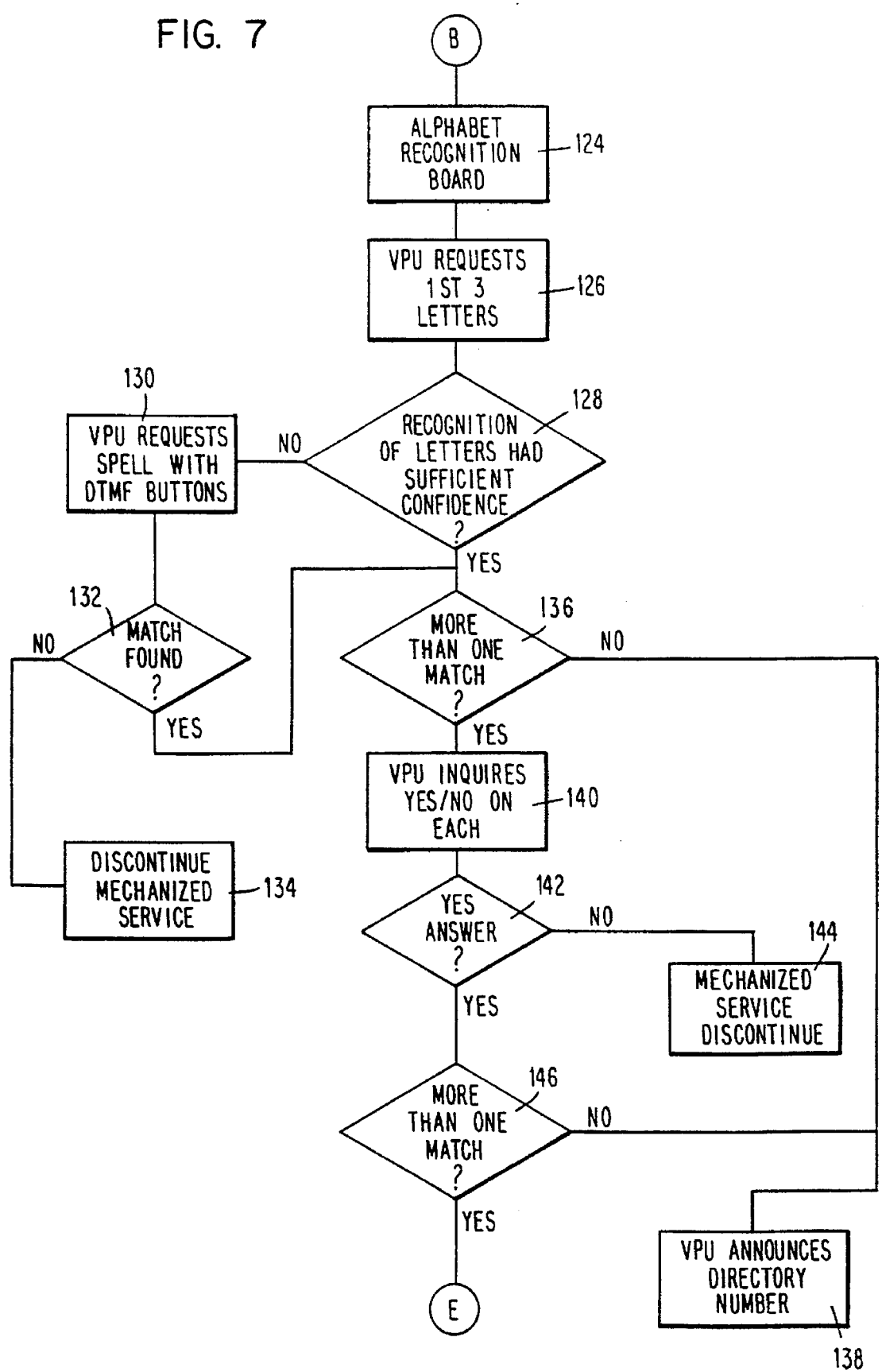

Returning to FIG. 3, if the determination at 76 is negative, i.e., if the city or location cannot be satisfactorily translated on the basis of the utterance of the user, the MDAS establishes a connection to the alphabet recognition board at 124 in FIG. 7 and the VPU at 126 requests the user to state the first three letters of the city or location name. When this has been done a determination is made at 128 as to whether the spoken letters may be translated by the alphabet recognition board with a sufficient probability level. If the letters of the alphabet articulated by the user can be decoded or translated by the alphabet recognition board with a sufficient level of probability a city/location database search is made and at 136 a determination is made as to whether more than one match has been located.

If the spoken alphabet letters cannot be translated with such a probability level the VPU at 130 requests the user to use the DTMF buttons on the telephone to indicate the first three letters of the city or location name. The use of the DTMF buttons for spelling purposes includes an inherent ambiguity by virtue of the lettered buttons containing multiple letters. When the user has complied with this request a determination is made at 132 as to whether a match can be found in the database on the basis of the DTMF information. If a match cannot be found the automated service is discontinued at 134 and the user is notified by the VPU to seek the assistance of a live operator and such a connection may be automatically made.

If the input from the DTMF buttons does provide information which permits a match in the database a determination is made at 136 as to whether more than one match exists. If there is only a single match the desired directory number has been located and the VPU announces such directory number to the user at 138.

If more than one match exists the VPU at 140 announces each of the matches to the user and requests a YES or NO response as to whether or not the indicated street has been located. If all of the responses are negative as determined at 142 the automated service is discontinued at 144 and the VPU makes an appropriate announcement to the user and connects to an operator if desired. If the determination at 142 locates the street a determination is made at 146 as to whether or not the database contains more than one directory number listed for that name and that street. If only a single directory number is located the VPU announces this at 138 as described. If more than one match is found the MDAS proceeds to ascertain the street number as has been described in connection with FIG. 7.

In order to support the aforementioned used of word recognition, phoneme recognition and the generation of probability values for each, the following techniques are described for the convenience of one skilled in this art. It is noted that the present invention is not limited thereto, since other techniques of phoneme and word recognition are known to those skilled in the art and can be applied to the present invention. Rather, the following techniques are provided by way of example only. The division of the discussion into sections and subsections is for the convenience of the reader who is occasionally asked to refer to different sections during the discussion of any particular section.

PART A: WORD-RECOGNITION SUPPLEMENTED BY PHONEME RECOGNITION

A.1 Word-recognition packages

Word-recognition packages usually consist of:

(a) hardware such as a plug-in PC board;

(b) software such as a suite of proprietary programs; and (c) data files, such as vocabulary files.

The preparation recommended by the manufacturer of such system is typically as follows.

A city on the list—e.g., Bowie—is chosen, and is uttered by a representative group of speakers. Each speaker repeats the city a specified number of times. (Some speakers may be discarded.) Eventually, a "standard" is established. The standard consists of a matrix of values, one axis being time-intervals, the other axis being frequency-intervals; the entries in the matrix may be regarded as sound intensities. The details of this matrix and its use in word-recognition are proprietary with the manufacturer. The "standard" is also frequently termed a "template". The standard is stored permanently in a file. This procedure is repeated for all cities on the list. Having established "standards", the same process is repeated, preferably using a new set of speakers.

When a speaker utters "Bowie", the word-recognizer generates a set of candidate cities, together with recognition scores, as follows:

| Candidate City | Recognition Score |
| --- | --- |
| Rockville | 650 |
| Bowie | 585 |
| Laurel | 382 |

Typically, recognition scores (on some arbitrary scale determined by the manufacturer) will fall in a range of 0–1200, with a high score representing higher probability in recognition indicative of the probability of a correct match. These raw recognition scores are referred to simply as "scores", and are used only to develop other parameters used in voice recognition.

A.2 Translating the Raw Score Into a Word-Confidence (W-Score) Figure

In general, the manufacturer does not provide any translation or method of getting to a confidence of probability value, which is designated W-score (word-probability score), namely, W-score=probability that Rockville is the correct city.

To establish such W-scores, a set of representative speakers is used. Each speaker utters all the cities on our list. The proportion of utterances for each city will correspond to the proportion that the city is requested in the real-life application. (Rockville, a large city, will be requested quite frequently, whereas Crownesville will be less frequent.) Alternatively, the experimental results may be weighted, so that the above proportions are attained. These utterances are submitted to the word-recognizer, and the selected number of recognized candidates (three or possibly more in number), and their scores, are stored (along with the correct city).

Figure 9:
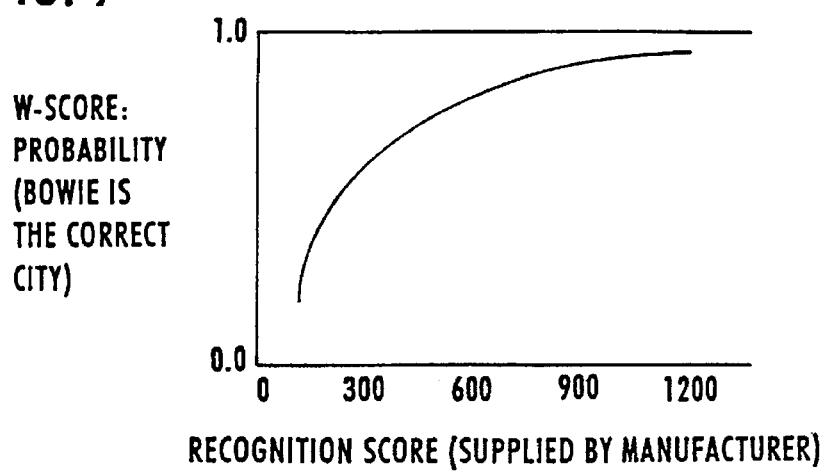
FIG. 9 is a graph of a Probability value-confidence function for a specific city.

A fairly straightforward manipulations is followed along the lines discussed in Section B.5–B.6. Also, a probability value/confidence-function generation as described in Part D, infra, is necessary. The result is the following function of FIG. 9. The W-score (probability value) is shown on the y-axis of this figure.

A.3 Use of Phoneme-Scores (C-Scores) to Supplement the W-Score

The same utterance, Bowie, can be analyzed from the point of view of phonemes, using a phoneme-recognizer. This will result in a C-score (phoneme-probability/probability value figure), exactly analogous to the W-score above. The method for getting the C-score is described in Section B.9, infra.

A.4 Combining Word-Recognition and Phoneme-Recognition

Two probability values are combined into a joint confidence figure or combined probability value as follows:

A two-parameter function, g, is developed where:

| joint probability (city is correct) | = g (phoneme probability, word confidence)) |
|---|---|
| | = g (C-score, W-score). |

A detailed example of the method of generating this function is given in Part D.

Figure 10A:
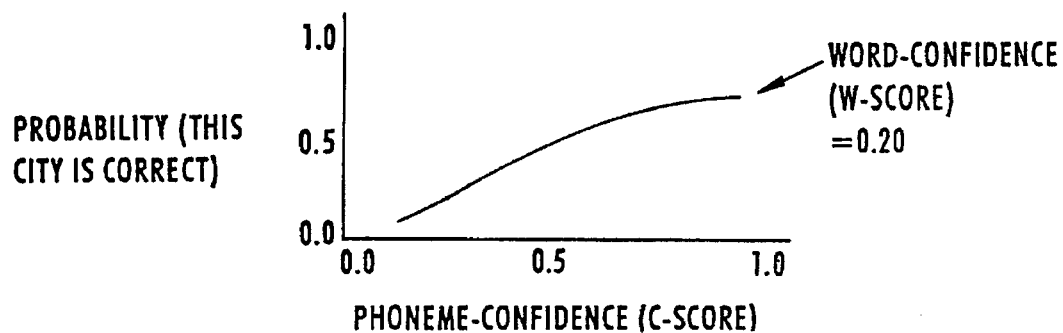
FIGS. 10A and 10B are graphs illustrating combined probability values between phoneme confidence and word-confidence scores of 0.2 and 0.4, respectively.
Figure 10B:
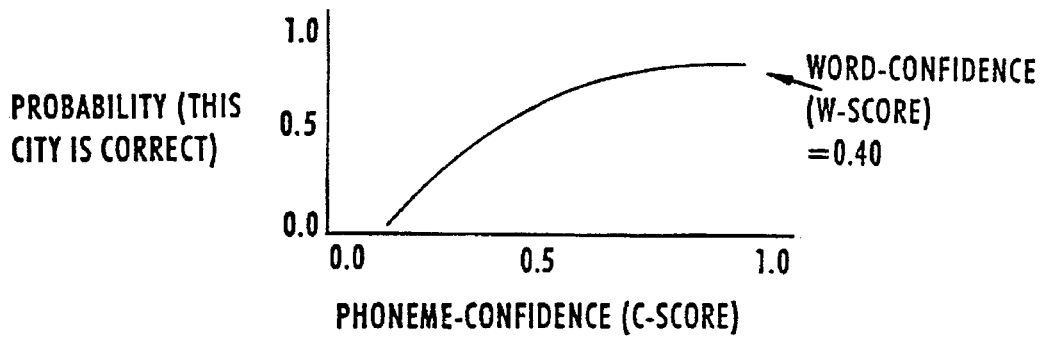

Functional relations are shown in FIGS. 10A and 10B for two cases of one parameter, namely word-confidence=0.2 and 0.4, respectively:

The speaker utters "Bowie", and the utterance is recognized both by the word-recognizer, and by the phoneme-recognizer. Responsive to the utterance of a user, the system generates the resulting city candidates, and their scores, as shown in the first three columns of the following table:

| Candidate | Word-Probability | Phoneme-Probability | Joint-Probability |
|---|---|---|---|
| Bowie | 0.4 | 0.62 | 0.78 |
| Rockville | 0.2 | 0.83 | 0.72 |
| Laurel | 0.4 | 0.72 | 0.81 |

The joint probability value (column 4 in the table of FIG. 8) from the joint probability function. On examining the fourth column, it appears that the best choice for this utterance would be Laurel, with a joint probability of 0.81.

A.5 Method for Developing the Combined Confidence-Figure

First, the preliminary work for phoneme-recognition, described in Section B.1–B.5, infra, must be done. The trial-speaker experiment described in Section A.3, supra, is also performed. However, this time, the utterances are provided to the phoneme-recognizer as well as the word-recognizer. The result is the following table:

| Candidate City | Word-Probability (W-score) | Phoneme-Probability (C-score) |
|---|---|---|
| Rockville | 0.42 | 0.34 |
| Bowie | 0.39 | 0.72 |
| Laurel | 0.21 | 0.34 |

The selected number of recognized candidates (three or possibly more in number), and their W-scores and C-scores, are stored along with the correct city. The techniques of Cluster analysis and curve-fitting described in Sections C.3–C.5 are used to obtain the two-parameter function. An example of this is given in Part D, and is good for all cities referred to in Section A4, infra.

PART B: PHONEME RECOGNITION

B.1 Phoneme Alphabet

The phoneme alphabet used in this system is preferably the 2-character ARPABET. One or two letters are used. However, the present invention is not limited to this alphabet.

A speech recognizer takes an utterance such as "next", and produces a set of phonemes, "n eh k s t". This ordered set is referred to as a string of phonemes so that the (true set of) uttered phonemes have been recognized as the string "n eh k s t". If the recognized string is "n ey k s t" (ey as in bait), one recognizes that the phoneme "ey" would be inaccurate, and as a result "ey" is substituted for "eh". If the recognized string is "n k s t", a gap is inserted where the "eh" should be. In addition, frequently one or more extraneous phonemes are recognized.

B.2 Other Recognized Features

The speech recognizer may, in addition, produce auxiliary symbols such as the glottal stop (represented by q), and other features of the utterance. These are ignored in the present discussion, while noting that they may be used in future versions to improve performance.

B.3 Preparation

B.3.1 The "Label" Phoneme-String: Phonetically Analyzing the City as Spelled To obtain our single "Label" phoneme-string, the city name is analyzed as spelled. This analysis could be assisted by an "Orator" type computer package. This kind of package—given a city (or other) proper name—will "orate" that name. In doing so, as a by-product, it will generate a single phoneme-string, which string may be retrieved and stored. This process, therefore, can be done in a completely automated fashion, and can even be done where there are a large number of such names, or they change frequently, as would be the case for the totality of business-names, last names, etc.

In some instances, the assistance of a consultant would be necessary since, for example, the city name "Georgetown" is notoriously mispronounced by an Orator package.

B.3.2 Phoneme-Strings Obtained From a Representative Group of Speakers

Each of the cities on the list—e.g., Bowie—is uttered by a representative group of speakers. Each speaker repeats the city a specified number of times. Let the total number of utterances for this city (all speakers) be 100. The resulting phoneme strings are noted. The frequencies (counts) for each string are calculated, and divided by 100 to obtain probabilities. calculated, and divided by 100 to obtain probabilities. We shall refer to this probability as the F-score. The strings are listed in order of descending F-score.

| Winchester: F-score | |
| --- | --- |
| w i n ch eh s t (er) | 0.55 |
| w i n ch uh s t (er) | 0.10 |
| w iy n ch eh s t (er) | 0.05 |

A number of these strings—the candidate group—are then retained and stored in what we shall call the F-file. In the above example, a number of strings, with total F-score 0.30, are not candidates, having been eliminated by application of the following rules.

The rules used to determine the retained number could include:

—Cutting off below a certain frequency

—Choosing a fixed number of candidate strings (say, 10)

A string-like "w i n ch s t (er)" could be included under a parent string like "w i n ch eh s t (er)" and may not figure in the candidate group. (The motivation for doing this will become apparent under the discussion of search procedure, infra.)

The rule for determining the total number of candidates might depend in part on the number of syllables or phonemes in the actual city name. It might be reasonable to pick more candidates for Winchester than for Bowie.

B.4 Preparation—Placing Candidate Strings in the F-File

The candidate group of strings, for each city, are merged into one F-file. The resulting file is organized for a B-tree search (as described by Robert L. Kruse, Data Structures and Program Design, 2nd Ed., 1986, Prentice-Hall, Englewood Cliffs, N.J., pp 382–398, incorporated herein by reference).

The string of phonemes is used as a key; the sole entry in the record is the F-score (0.70, 0.15 etc) for the corresponding city. (The above structure may need to be modified to allow for the rare situation where the same phoneme string indicates two different cities.)

B.5 Preparation—Transition Matrix

A transition matrix is prepared for the entire set of phonemes. (The term transition matrix, or simply matrix, is used for convenience; a more accurate description would be conditional probability matrix).

Take the uttered phoneme eh (bet). If the phoneme aw (down) is recognized, when eh is uttered, this would be incorrect, but could happen in a fraction of cases.

Considering the situation from the point of view of the recognized phoneme, for example "aw", a determination must be made regarding the probabilities (which will sum to 1.0) that the uttered phoneme was in fact:

aw (that is, this phoneme was correctly recognized)

eh (bet)

oy (boy)

ah (but)

... etc.

Probability (that the Actual phoneme uttered was):

| | aw | eh | oy | ah ... | total |
| --- | --- | --- | --- | --- | --- |
| Recognized phoneme aw: | 0.76 | 0.06 | 0.04 | 0.03 ... | 1.00 |

A complete matrix (about 47×47) with the 47 recognized phonemes (iy), iy, ey, eh, ae aa, ah, ... nx in the left-hand column, is produced in this way.

B.6 Using the Speaker Trials to Get the Transition Matrix

The trials used in section 3.0 to get the candidate group of strings for Bowie (etc.), can also be used to get the phoneme matrix of the previous section. However, each city is to be weighted by the corresponding frequency in real life (e.g. directory information). Take the results for 100 utterances of Hootertown, assuming that the correct phoneme (first syllable) is uw, and that every speaker is, in fact, trying to say uw. That is, the speaker always utters uw.

Suppose that the following conditions exist:

50=the frequency that uw is recognized, corresponding to the uttered "uw"

5=the frequency that oy is recognized, corresponding to the uttered "uw"

35=the frequency that uh is recognized, corresponding to the uttered "uw" ... etc (10=total frequency for other phonemes that were recognized, corresponding to the uttered "uw")

These frequencies must be weighted by the probability (0.023, say) that the general public specifies Hootertown as the city, and then combined with similar weighted frequencies from all the other cities. The transition matrix produced is thus specific to this group of names (cities) and the particular application. For other applications (uttering last names or business names) it is similarly necessary to weight the test names appropriately.

B.7 The Search Algorithm

B.7.1 Introduction

For the whole word-phoneme combined recognition method, Part A, the description of "search" and "branch- and bound procedure" is ignored in this Section and the following one. No search is needed, and all candidate phoneme-strings are enumerated, as discussed in Section B.11.

An utterance of a city name (Bowie) is made, and a phoneme string is recognized, for example, "b oy (iy)". A search of the B-tree organized phoneme-string file is then made. The general method used is a modification of the branch and bound method of integer programming (as described by Hillier and Lieberman, Introduction to Operations Research, 4th Ed., Holden-Day (1986), Oakland, Calif., pp. 403–421, incorporated herein by reference).

The search commences with the phoneme "b", and then progresses to "oy" and then "(iy)". Suppose that this search of the F-file proceeds unimpeded, and ends up with an exact match at the string "boy (iy)" w h i c h corresponds of course to the candidate city "Bowie".

If this record (phoneme-string) has an F-score of 0.15 (15% of the experimental panel were recognized as saying, the exact string "b oy (iy)"), then the F0-score would then be translated into a C-score using the estimating function on Section B.9. If the C-score is 0.85, the choice of "Bowie" in these circumstances, an exact phoneme-string match on "b oy (iy)", will be correct 85% of the time.

Not all recognized phoneme strings will have such a simple, exact match, outcome, as we shall now consider.

B.7.2 Penalty Points

B.7.2.1 Gaps (Missing Phonemes)

Next, the system addresses the recognized string w i n ch eh t (er)

(in which the correct phoneme, s, where the space is, failed to get recognized at all). The search proceeds with "w i n ch eh" and then the continuation "t" would not be found.

All continuations are examined, and only one is found, namely "s". The "s" is assumed (as missing), one penalty point is assessed, and the search continues with "t (er)".

At this point the search concludes at Winchester, with an F-score (from the terminally found record) of, say, 0.69, and one penalty point. One penalty point is counted for each phoneme that is missing; this includes any phonemes that are missing from the end of the recognized string. Thus "w i n ch eh s t" [missing the terminal (er)] would have one penalty point.

B.7.2.2 Extraneous Phonemes

When the recognized string is "w i n ch eh s k t (er)" the phoneme "k" is reached, and the B-tree search deadends. By ignoring the "k", the B-tree search can continue. One penalty point is counted for this extraneous phoneme.

B.7.3 Substitution Phoneme—The S-Score

It is only possible to continue a search by changing a phoneme so that in the string "w i n ch uw . . . ", the B-tree search dead-ends at "uw". By examining all the continuations from "w i n ch, uw" must be assumed to be really "eh", as this is the only continuation that leads anywhere. The transition matrix is checked to find, for example, that: probability (a recognized "uw" is really an uttered "eh")= 0.25. The substitution score (S-score) was initialized at 1.0, and it now becomes 1.0*0.25=0.25.

When other substitutions are found, it is possible to multiply the S-score by the appropriate transition probability. Thus, when "w i n ch uw s k (er)" is selected where, for example, the probability (a recognized "k" is really an uttered "t")=0.1, an S-score of 0.25*0.1=0.025 would result.

B.8 The Search: Branch and Bound Method

B.8.1 Introduction

The current search path is abandoned when:

—three or more penalty points are accumulated. (The rule two or more may be preferable.)

—when the S-score drops below a threshold (for example, 0.02).

In the branch and bound method, searches are pursued (one or more steps at a time) along different paths. The search is continually switched to the paths that seem most promising. When a particular search has resulted in finding a phoneme-string record such as "w i n ch eh s t er"= Winchester, F-score 0.86, it is said to be terminated, and the three quantities:

(a) penalty points (e.g. 2: the count of missing and extraneous phonemes);

(b) S-score (e.g. 0.025: derived from substitution phonemes);

(c) F-score (that is 0.86, for Winchester recognized as "w i n ch eh s t (er)", are referred to as terminal quantities.

From the three quantities, using a formula (algorithm) which is obtained heuristically, as described below, a C-score (Probability) is obtained. Each path, unless it is abandoned, terminates at a city and results in another C-score.

B.8.2 Bounding

Suppose the required number (for example, 3) of candidate C-scores have accumulated, with the lowest at 121, the C-score 121 is called the threshold. As a result, any search path where the current C-score falls below the threshold will immediately be abandoned. This is referred to as bounding.

Note that at any point in the search the current C-score may be calculated from the current penalty points and the current S-score. The F-value is unknown (since it depends on which phoneme-string is finally used) and is arbitrarily set to 1.0. Because of the restrictions placed on the C-score function, it is clear that the current C-score decreases (is non-increasing) as the path length increases.

B.8.3 Branching

Alternate searches, perhaps making use of substitute phonemes "oy" in place of "eh", or assuming missing or extra phonemes, can be picked up at any time where they left off. This is referred to as branching.

B.8.4 Continuing the Search Procedure

A new candidate that beats the threshold bumps the lowest scoring candidate from the group. The trick is to achieve the required number of C-scores as quickly as possible, with scores as high as possible (giving a standard for remaining searches).

B.9 Estimating the Phoneme-Probability Figure (C-Score)

B.9.1 Introduction

The term probability is a convenient one, although the quantity under discussion is simply the probability of selecting the correct city.

Suppose three candidates have been identified with phoneme-confidence figures (C-scores) as shown:

| Winchester | 0.55 |
| Winklesea | 0.15 |
| Westminster | 0.07 |

There is at present no theoretical means of calculating this C-score, because of the size of the various groups involved in our type of application. Therefore, Monte Carlo methods are used, as discussed in Section C.2, to get an estimating function for the C-score and provide C-score estimates for the three candidate cities. This function is herein incorporated by reference into this application.

B.9.2. Probability Value—Using the Delta Value

The above C-scores are estimated probability, based on each candidate city considered independently. These scores are raw C-scores. A further refinement is as follows. A multiplicative factor may be developed to apply to the raw C-scores which depends on the nature of the three top scores, specifically on the delta between the first two scores. It is also possible to use the delta between second and third scores, as well. This multiplicative factor reflects a decision method which is commonly used in voice recognition.

If there is an outstanding candidate (a large delta), it will be chosen with confidence. If the delta is small, the confidence in all of the candidates may be lowered.

B.10 Continuous Refinement

All of the above assumptions, functions, thresholds, etc, can be constantly adjusted by monitoring the application in production use.

B.11 Use of Phoneme Recognition in Conjunction with Whole-Word Recognition

In the situation described in Part A, where a word-recognizer has selected, for example, three city candidates: Bowie, Luray and Rockville, accompanied by word-confidence figures (W-scores), which are not shown. The same utterance is submitted to the phoneme-recognizer, obtaining, for example, the recognized phoneme string "b ow (iy)".

Choosing the first candidate city Bowie, having four representations in the F-file (see Section B.4), the first row in the table, the "label-string", in the phoneme string that theoretically (and with expert advice) corresponds to the spelling of Bowie. The next three rows were produced experimentally. For these rows the second column, the F-score, is the proportion of cases that result from our experimentation with a panel of typical speakers. The figures do not sum to 1.0, because a few speakers say "Bowie" with other phoneme-strings.

The F-score for the first row, the "label-string", is arbitrarily set to 1.0.

| Standard Phoneme-string | F-Score |
|---|---|
| The "label-string": | |
| b uh w (iy) | 1.00 |
| Experimentally-derived strings: | |
| b uh (iy) | 0.45 |
| b aw (iy) | 0.22 |
| b uh iy | 0.13 |

If the recognized phoneme string, "b ow (iy)", is exactly equal to one of the four strings above (actually it is not), the C-score would be calculated using the variables: S-score: 1.0; penalty points=0; and F-score=(whatever the F-score is in the above table).

If the recognized string is not equal to any of the four strings above, it is compared to each one in turn, starting with "b uh (iy)", F-score: 0.45. We calculate the S-score, and the penalty points. The F-score is 0.45. Then the C-score is calculated.

Similarly, the C-score for the other three strings is calculated. The highest is the C-score.

This is probability value for choosing Bowie. Next, considering the second candidate city, Luray, with stored strings:

| standard phoneme-string | F-score |
|---|---|
| The "label-string": | |
| l uw r ey | 1.00 |
| Experimentally-derived strings: | |
| l aw r ey | 0.15 |
| l uw r ah | 0.13 |

The above process is repeated to obtain the probability value for choosing Luray. The result is the required confidence figures (C-scores):

| Bowie | 0.65 |
|---|---|
| Luray | 0.22 |
| Rockville | 0.05 |

The rest of the procedure is described in Part A.

Note that no "search procedure" or "branch-and-bound" method is needed in the above. The three cities on which to concentrate are already known, and the number standard phoneme-strings corresponding to these cities is small enough so that the whole set can be analyzed exhaustively.

Part C: AN ESTIMATING FORMULA FOR PHONEME-CONFIDENCE (C-SCORE)

C.1 Introduction

The function confidence (C-score)=f(S-score, penalty pts., F-value) is to be expressed, or derived, using polynomials, exponentials, log and logistic functions, etc.

C.2 Monte Carlo Method

Experimental data using the Monte Carlo technique (in Hillier and Lieberman, Introduction to Research, 4th Ed., Holden-Day (1986), Oakland, Calif., pp. 812–816, already incorporated herein by reference) is obtained as follows.

C.2.1 Choose a City

A city is chosen, for example, Bowie.

C.2.2 Simulate Utterances

A large number of utterances of this city name are simulated, for example, 100.

C.2.3 Candidate Phoneme-Strings

First, the candidate group of phoneme-strings stored in the F-file are considered as follows:

| b uh (iy) | 0.45 |
|---|---|
| b aw (iy) | 0.22 |
| b uh iy | 0.13 |

Class A strings: This is the number of cases (recognized strings) needed to generate for each of the above stored strings, namely 45, 22, 13, etc., (adds up to 80 cases) and is known.

Class B strings: For the remainder of the utterances (20 of them) recognized phoneme strings are randomly generated as follows:

The correct (highest F-score) stored phoneme string is selected, for example, "b uh (iy)". Each phoneme is considered in turn. If, for example, the phoneme uh is considered, a random draw from the column of the matrix corresponding to the uttered uh is made. If the phoneme "aw" is picked, this will be the recognized phoneme. The string to date now reads "b aw . . . ".

The process continues for all the remaining nominal phonemes. If this results in one of the stored candidate strings, discard it. Also missing and extraneous phonemes are to be generated randomly, according to data that was complied during the utterance tests. We shall call these generated recognized phoneme-strings Class B strings.

C.2.4 Search Algorithm

Each generated string is submitted to the search algorithm.

For the Class A strings, the result is known. For example, the (stored) recognized string "b aw (iy)" F-score: 0.22 will certainly, after a search has been performed, end up as "b aw (iy)"=Bowie. This is a successful result and is scored as 1. This is because it is one of the three stored strings for Bowie. Therefore, there is no need to actually perform the search.

The terminal values are: (a) S-score: 1.0 (no substitutions were necessary); (b) the penalty points are 0 (there were no missing or extraneous phonemes in the string that was recognized; and (c) The F-score is simply 0.22.

C.2.5 Class B Strings

The Class B strings are more complicated. For example, the recognized string "b aw p eh" is generated.

This is not, of course, one of the three stored strings for Bowie (otherwise it would have been discarded). This recognized string is submitted to the search method described in Section 8. If the result is the terminal stored string "b uh (iy)" Bowie, F-score 0.45, and the terminal values are (a) S-score: 0.33 (two substitutions were needed); (b) Penalty pts.=1 (there was one extraneous phoneme, namely p); and (c) F-score is 0.45 (taken, of course, from the above record), the following result is a success (scored as 1).

If, in the alternative, the string had been "b r ae n d (iy)=Brandy, F-score 0.21", which is believed to be another stored string in the F-table, the following terminal values may have occurred:

—S-score: 0.12 (two substitutions were needed)

—Penalty pts.: 2 (there were two extraneous phonemes)

—F-score 0.21 (taken, of course, from the above record), and

—the result is Fail (scored as 0).

C.2.6 Repeat for Each City

The above steps are repeated for each city in turn. The results are to be weighted according to the relative frequency with which cities are requested.

C.3 Best-Fit Function for Confidence (C-Score)

A function is needed having the form C-score=f (S-score, penalty pts., F-score). The variables S-score, penalty pts., and F-score are referred to as the independent variables. The C-score is referred to as the dependent variable. The following is an heuristic procedure.

The function f must: (a) increase with the F-score (the other independent variables being held constant); (b) increase with the S-score (the other independent variables being held constant); and (c) decrease as penalty points increase (the other independent variables being held constant.

C.4 Clustering Techniques

First, the experimental cases (Class A and B above) must be conveniently grouped, or split, into clusters. An obvious splitting rule is to split cases with Penalty points of 0, 1 and 2 respectively, into three segments. Next, for the two continuous variables, S-score and F-score, and interval method of splitting is very popular.

The above splitting methods would result in a table like Table C1 below. A C-score function may then be derived using best-fit steepest ascent techniques. (See Part D for an example). This function will provide a best-fit, where the last two columns will correspond closely. The sum of squares of differences between these last two columns is generally used as a metric for the goodness-of-fit.

The most convenient method—described in Part D 0 is to use a spreadsheet, such as Claris Resolve. The coefficients of the various independent variables can be manually adjusted, to obtain a best-fit function. The advantages of this manual technique are that (a) it is easy to satisfy the constraints in Section C.3, supra; (b) the technology is confined to linear combinations of the independent variables, but can use any mathematical expression, including products, logistic functions, etc.; and (c) the system can use a combination of separate functions for separate, disjoint, regions of independent-variable space.

TABLE C-1

Splitting methods for the S-score

| Range of S-score | Penalty Points | Range of F-score | Predicted Probability | Actual Success fraction |
|---|---|---|---|---|
| 0.2–0.3 | 1 | 0.8–1.0 | 0.64 | 0.61 |
| 0.3–0.4 | 1 | 0.8–1.0 | 0.72 | 0.74 |
| 0.4–0.6 | 1 | 0.8–1.0 | 0.82 | 0.79 |
| 0.6–0.8 | 1 | 0.8–1.0 | 0.85 | 0.86 |
| 0.8–1.0 | 1 | 0.8–1.0 | 0.92 | 0.93 |
| 0.2–0.3 | 2 | 0.8–1.0 | 0.44 | 0.41 |
| 0.3–0.4 | 2 | 0.8–1.0 | 0.52 | 0.54 |
| 0.4–0.6 | 2 | 0.8–1.0 | 0.62 | 0.59 |
| 0.6–0.8 | 2 | 0.8–1.0 | 0.65 | 0.66 |
| 0.8–1.0 | 2 | 0.8–1.0 | 0.72 | 0.73 |
| 0.2–0.3 | 1 | 0.6–0.8 | 0.54 | 0.51 |
| 0.3–0.4 | 1 | 0.6–0.8 | 0.62 | 0.64 |
| 0.4–0.6 | 1 | 0.6–0.8 | 0.72 | 0.69 |
| 0.6–0.8 | 1 | 0.6–0.8 | 0.75 | 0.76 |
| 0.8–1.0 | 1 | 0.6–0.8 | 0.82 | 0.83 |

More standard methods that can be applied are incorporated by reference herein:

SAS Users Guide: Statistics Version 5 Edition, 1985, SAS Institute, North Carolina:
and include:
Regression procedures, pp 1–13 (references p. 12–13)
Stepwise procedure: PROC STEPWISE, p. 6
Non-linear procedures: PROC NLIN, p. 6

C.5 Augmenting the Independent Variables

The original independent variables (three in number) may be augmented by using powers of the variables, logs, exponential functions. Suitable interactive packages for this purpose include statalyzer (Statalyzer 1.1, BrainPower Inc. 30497 Canwood Street, Suite 201, Agoura Hills, Calif. 91301, 800-345-0519) which runs conveniently on a Macintosh.

PART D: EXAMPLE OF GENERATING A CONFIDENCE FUNCTION

In this Part, an example of least-square fitting of a confidence-generating function is considered. This particular case is for generating a joint-confidence-function where word-recognition and phoneme-recognition confidence figures have already been obtained.

D.1 Use of Spreadsheet

If a large number of speaker-trials have been performed, the resulting city candidates, word-probability figures (W-scores), phoneme-confidence figures (C-scores), and the result correctness (1 or 0) for the selected city would have been stored.

Figures 11, 11A:
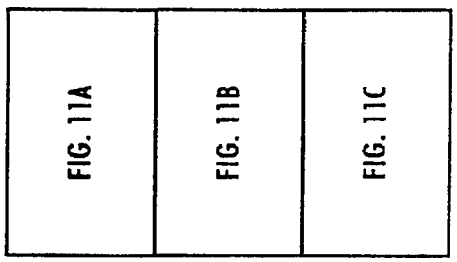
Figure 11C:
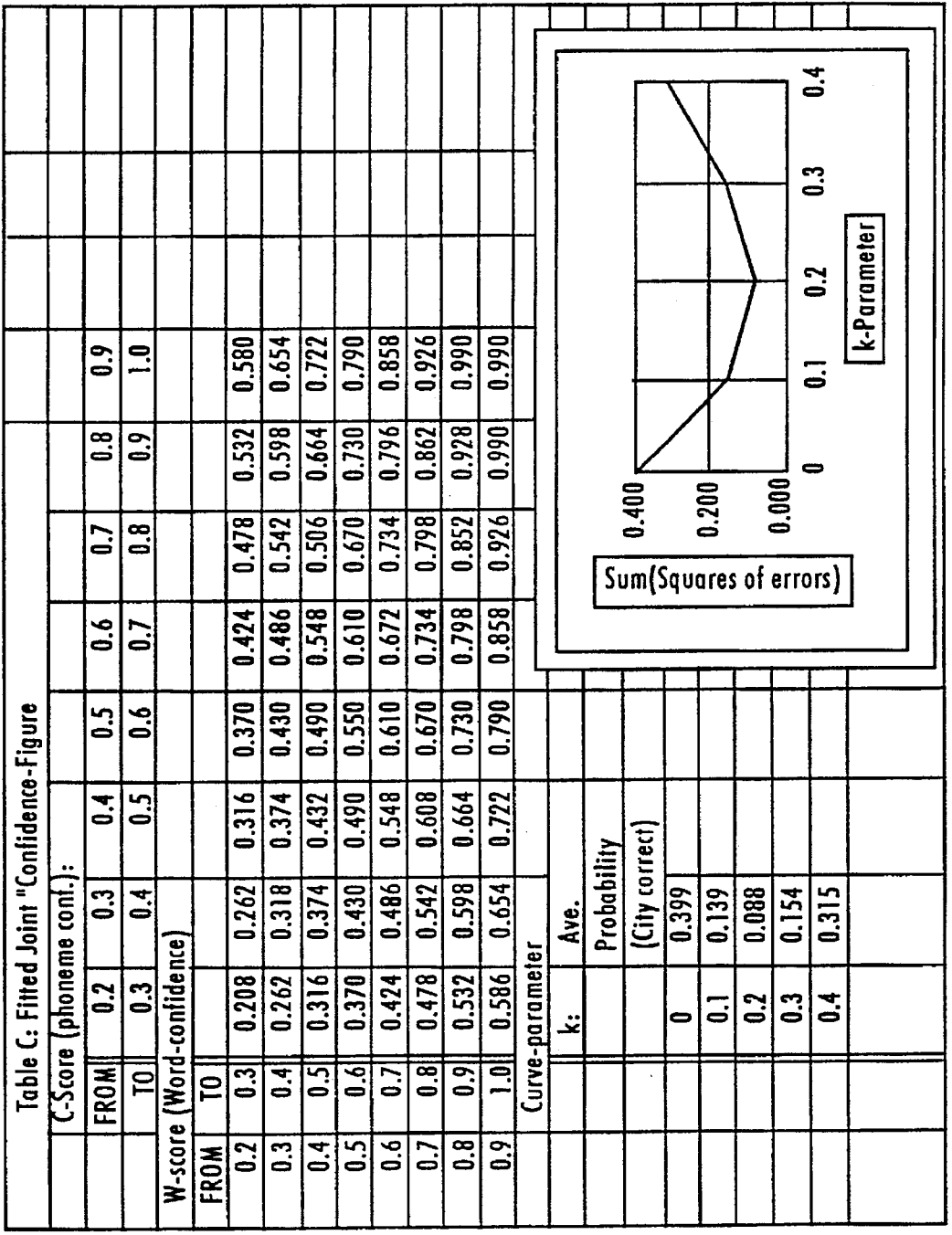

The spreadsheet in FIG. 11 shows these results summarized in Tables A and B on the following page. For all tables (A, B and C), the left-hand labels 1 (i.e., the row labels) show the Word-probability figures (W-score) split into convenient ranges. The choice of this split is left to the user. The clustering techniques referred to in Hartigan (1975), Jain (1988) and Truelove (1981) are relevant. The column-headings show the phoneme-probability figures (C-score), again split into ranges. Table A shows the relative frequency of the observed W-score, C-score pairs. For example, if: Row "W-score 0.6–0.7" and column C-score 0.8–0.9"; the frequency is 0.020. Out of 1000 trials, for example, 2% resulted in W- and C-score in the corresponding ranges.

Table B shows the joint-probability of the city being correct. In the cell referred to above, the entry 0.744 indicates that 74.4% of the time we would choose correctly in this situation.

On examining the Table B, the form of the generating function joint prob.(city) correct=0.5(W-score+C-score)+k (W-score*C-score) where k is a parameter to be determined, suggests itself. This function is understood to be bounded above by 1.0, but this detail has been omitted in this description.

Table C shows one particular result for the function, for the value k=0.2.

For the cell referenced above, the entry of 0.796 is found. This is compared with the observed figure of 0.744. The error is 0.052. This error is squared. The errors for all cells are summed, weighted first by the relative frequency given in Table A, the "sum of squares of errors" is shown in the following row of the last (2-column) table in the spreadsheet:

| k | Ave. Probability (City correct) |
|---|---|
| 0.2 | 0.088 |

In fact, each entry in the second column is the average of a number of replications of the whole trial.

The resulting sum (squares of errors) is shown as the y-variate, plotted against the k-parameter as the x-variate, in the graph in this spreadsheet. It will be seen that the minimum sum (squares of errors) is found at the point k=2.

Substituting this value for k, the resulting best-fit joint probability generating function would thus be: joint prob. (city) correct=0.5(W-score+C-score)+0.2(W-score*C-score).

D.2 Comments

D.2.1 Convenience of Spreadsheet Technique

The spreadsheet lay-out is particularly convenient when there are only two independent variables, in this case: W-score, and C-score, since a single spreadsheet table can tabulate all the experimental values, as shown above. A spreadsheet can also be used with three or four independent variables, by providing for the necessary number of basic W-score vs. C-score tables. Each table corresponds to a unique pair of values for the remaining (one or two) variables.

The advantage of a manually executed curve-fitting technique, as above, is that different portions of the table can be fitted with different mathematical functions. This is done, of course, by inserting the necessary formula into the relevant cells of its domain. Within this domain, the formula can be transferred to other cells by the fill down, fill right command. In the above example, it was only necessary to type the formula into the (0.2, 0.2) cell. The remaining cells were filled using the fill down and fill right commands. The values of the variables: W-score, C-score are taken automatically from the respective bordering cells. (Claris Resolve User's Guide, section 2).

It is the responsibility of the user to see that the functions are continuous (or, better, smooth), at the borders of their defined regions

D.2.2 Programmed Applications

When only one independent parameter, such as the parameter k in the above example, is involved, manual spreadsheet techniques may be adequate.

When more than one parameter is involved, as would be the case with the more complicated phoneme-confidence function, a programmed application will be appropriate. First, a function is set up that calculates the sum of squares of errors, as in the above example. Suppose there are two parameters, a and b. The appropriate ranges for these parameters are specified. Initial starting values are chosen. An optimal hill-climbing procedure is then executed, the object of which is to obtain the parameter-pair which results in the smallest sum of squared-errors. A detailed description of such a procedure is given in Blischke and Truelove (1969), together with program listings.

The following publications provide a more detailed explanation of the aforementioned techniques used to carry out the present invention, and are hereby incorporated by reference:

W. Blischke, et al., "On Non-Regular Estimation: I—Variance Bounds for Estimators of Location Parameters", J. American Statistical Assoc., September 1969, Vol. 64, pp. 1056–1072.

Claris Resolve User's Guide, 1991, Claris Corp., Santa Clara, Calif.

Robert L. Kruse, Data Structures and Program Design, 2nd Ed., 1986, Prentice-Hall, Englewood Cliffs, N.J., pp. 382–398.

Hartigan, J. A., Cluster Algorithms, 1975, Wiley, New York.

F. S. Hillier, et al., Introduction to Operations Research, 4th Ed., Holden-Day (1986), Oakland, Calif.

A. Jain, et al., Algorithms for Clustering Data, 1988, Prentice-Hall, New Jersey.

SAS Users Guide: Statistics Version, 5th Edition, 1985, SAS Institute, North Carolina.

Statalyzer 1.1 Documentation, BrainPower Inc. 30497 Canwood Street, Suite 201, Agoura Hills, Calif. 91301, 800-345-0519, April 1990.

Alan J. Truelove, Application of Cluster Analysis to file-merging, U.S. Treasury Research Report OS-1054, May 15, 1981.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A method of providing subscriber telephone numbers to telephone users in an automated fashion comprising the steps of:

(a) connecting a telephone user to an automated directory assistance station upon a user dialing a predetermined number on a telephone;

(b) instructing the user with a stored message upon said connection to respond by speaking a name of a location of a sought subscriber;

(c) encoding a first response from the user into a first digital signal compatible with means for speech recognition;

(d) transmitting said first digital signal to first means for speech recognition by word recognition and second means for speech recognition by phoneme recognition;

(e) decoding first output signals from said first and second means for speech recognition to produce first and second decoded signals and a probability level signal associated with each decoded signal, said probability level signals being indicative of a probability that a respective decoded signal is correct with respect to the first response;

(f) combining said probability level signals associated with said first and second decoded signals according to a predetermined function to derive a plurality of combined probability level signals;

(g) comparing each said combined probability level signal to a predetermined threshold;

(h) selecting one of said first and second decoded signals associated with the highest combined probability level signal to provide a first selected signal;

(i) addressing a database for a location indicated by said first selected signal;

(j) instructing the user with a stored message to respond by speaking the last name of the sought subscriber;

(k) encoding a second response comprising the last name from the user into a second digital signal compatible with said first and second means for speech recognition;

(l) transmitting said second digital signal to the first and second means for speech recognition;

(m) decoding second output signals from said first and second means for speech recognition to produce third and fourth decoded signals and a probability level signal associated with each of said third and fourth decoded signals with respect to said second response;

(n) selecting one of said third and fourth decoded signals having the highest probability level to provide a second selected signal;

(o) searching said database using said second selected signal to obtain a directory number corresponding thereto; and (p) transmitting a message to the user articulating said directory number.

2. A method according to claim 1 including the steps of:
   responding to locating multiple matches in said database as a result of steps (i) or (o) by transmitting to the user a voiced selection of words with a request for an affirmative or negative response.

3. A method according to claim 2 wherein said user is requested to indicate said affirmative response or said negative response by voicing "YES" or "No".

4. A method according to claim 2 wherein said user is requested to indicate said affirmative response or said negative response by striking a DTMF key designated in said request.

5. A method according to claim 1 including the steps of:
   responding to locating multiple matches in said database as a result of steps (i) or (o) by requesting the user to speak an additional indicia of the sought subscriber;
   encoding a third response from the user into a third digital signal compatible with said first and second means for speech recognition;
   transmitting said third digital signal to said first and second means for speech recognition;
   decoding and translating a fifth decoded signal responsive to the transmitting of said third digital signal; and
   wherein the step (o) further comprises searching said database using said fifth decoded and translated signal.

6. A method of providing subscriber telephone numbers to telephone users in an automated fashion comprising the steps of:

(a) connecting a telephone user dialing a predetermined number on a telephone to an automated directory assistance means;

(b) instructing the user with a stored message upon said connection to respond by speaking an indicia of the location of a sought subscriber;

(c) encoding a first response from the user into a first digital signal compatible with means for speech recognition;

(d) transmitting said first digital signal to first means for speech recognition by phoneme recognition and second means for speech recognition by word recognition;

(e) generating a plurality of candidate words from said second speech recognition means, said candidate words being expressed as encoded signals output by said second speech recognition means related to said first response;

(f) decoding signals output by said first and second speech recognition means responsive to said first digital signal to produce first and a plurality of second decoded signals and a probability level signal associated with each decoded signal, said probability level signals being indicative of a probability that a respective decoded signal is correct with respect to the first response;

(g) comparing said probability level signals from said second speech recognition means to a predetermined threshold level and, if one of said probability level signals is equal to or greater than said threshold level, addressing a database of directory number data for a first location indicated by the decoded signal associated with the one probability level signal greater than or equal to said threshold level;

(h) if all said probability level signals associated with said second plurality of decoded signals are less than said threshold level, combining said probability level signals from said first and second speech recognition means to obtain a plurality of combined probability level signals;

(i) selecting one of said first and second decoded signals having the highest combined probability level signal;

(j) addressing a database of directory number data for a second location indicated by the one selected signal;

(k) instructing the user with a stored message to respond by speaking an indicia of a name of the sought subscriber;

(l) encoding a second response spoken by the user into a second digital signal compatible with said first speech recognition means;

(m) responsive to input of said second digital signal decoding an output of said first speech recognition means to produce a third decoded signal;

(n) using said third decoded signal searching said database for said second location to obtain a directory number corresponding to the second response; and (o) transmitting a message to the user articulating said directory number.

7. A method according to claim 6 including the steps of: responding to locating multiple matches in said database as a result of steps (j) or (n) by transmitting to the user an audio selection of words with a request for an affirmative or negative response.

8. A method according to claim 7 wherein said user is requested to indicate said affirmative response or said negative response by voicing "YES" or "NO".

9. A method according to claim 7 wherein said user is requested to indicate said affirmative response or said negative response by striking a key designated in said request.

10. An automated directory assistance system for use in a telecommunications network connected to a plurality of telephone stations comprising:

means for speech recognition, means for voice processing, and computer means for controlling said voice processing means and said speech recognition means;

a database associated with said computer means, said speech recognition means and said voice processing means;

said speech recognition means including means for word recognition and means for phoneme recognition, each encoding voice signals inputted thereto and providing an output candidate signal indicative of a sought word signified by said voice signals and an associated probability level signal indicative of a probability level in the accuracy of the word signified by the output candidate signal, said speech recognition means further including means for calculating a combined probability value signal by combining the probability level signals associated with the output candidate signals from the respective word recognition means and phoneme recognition means to obtain a combined probability level signal for each output candidate signal, the combined probability level signal indicating a recognition accuracy between said output candidate signal of the word recognition means and an associated output candidate signal from said phoneme recognition means;

said database including stored word and phoneme data;

said voice processing means including stored voice messages;

comparator and selector means associated with said word recognition means and said phoneme recognition means for comparing the probability level signals associated with respective the output candidate signals of said word recognition means and said phoneme recognition means responsive to said voice signals and selecting one of said output candidate signals having an associated combined probability level signal with the highest value;

said computer means comprising means for:

(a) causing said voice processing means to transmit, to a user having dialed directory assistance, instructions to speak a word or words indicative of an identity of a subscriber whose directory number is sought;

(b) causing said voice signals resulting from a response from the user to be inputted to said word recognition means and said phoneme recognition means;

(c) causing said word recognition means and said phoneme recognition means to encode said voice signals to produce said respective output candidate signals and said corresponding probability level signals;

(d) to cause said comparator and selector means to compare said probability level signals, the combined probability level signal with the highest value, and access said database using the corresponding selected one output candidate signal to identify a directory number in said database; and (e) causing said means for voice processing to direct to said user a signal indicative of said directory number.

11. An automated caller assistance system for use in a telecommunications network connected to a plurality of telephone stations comprising:

means for speech recognition, means for voice processing, and computer means for controlling said voice processing means and said speech recognition means;

a database associated with said computer means, said speech recognition means and said voice processing means;

said speech recognition means including means for word recognition and means for phoneme recognition, said word recognition means comprising means for generating a plurality of candidate words for each word spoken by a user, each said candidate word represented by an output candidate signal with an associated candidate probability level signal, said phoneme recognition means comprising means for generating a plurality of phonemes associated with each of said candidate words, each said phoneme being represented by an output phoneme signal and an associated phoneme probability level signal, said speech recognition means further comprising means for combining the candidate probability level signal for each said word candidate with the phoneme probability level of each of said phonemes associated with a respective candidate word according to a predetermined function to obtain a plurality of combined probability level signals for each said candidate word;

said database including stored word and phoneme data;

said voice processing means including stored voice messages;

comparator and selector means, associated with said word recognition means and said phoneme recognition means, for comparing the candidate and phoneme output signals responsive to each word spoken and selecting the candidate word having the corresponding combined probability level signal with the highest value;

said computer comprising means for:

(a) causing said voice processing means to transmit instructions prompting the user to speak a word or words indicative of the nature of the assistance which is sought;

(b) causing said each word resulting from a response from the user to be inputted to said word recognition means and said phoneme recognition means;

(c) causing said word recognition means and said phoneme recognition means to encode said each word to produce the respective candidate and phoneme output signals and candidate and phoneme probability level signals;

(d) causing said comparator and selector means to compare said probability level signals, identify the combined probability level signal with the highest indicia of probability, and associate the candidate word corresponding thereto with said database to identify an assistance associated therewith in said database; and (e) causing said means for voice processing to direct to said user an audio signal indicative of said assistance.

12. A method for automatically providing subscriber telephone numbers to telephone users over a telephone line, comprising the steps of:

(a) connecting a telephone user dialing a predetermined number to an automated directory assistance station;

(b) transmitting a first response from said user to a speech recognition device comprising means for recognizing a word from among a plurality of words and means for recognizing a phoneme string for association with a respective word;

(c) obtaining a plurality of word candidates related to said first response from the word recognizing means, each of said word candidates having a probability value indicating a probability that said each word candidate is correct with respect to said first response;

(d) selecting one of the word candidates having a highest probability value;

(e) comparing said highest probability value of the selected word candidate to a first threshold value;

(f) if said highest probability value is equal to or greater than said first threshold value, accessing a first database to obtain first information corresponding to said selected word candidate;

(g) transmitting said first information to said user;

(h) if said highest probability value is less than said first threshold value, obtaining at least one phoneme string associated with each said word candidate, each said phoneme string having a probability value indicating a probability that said each phoneme string is correct with respect to said first response;

(i) combining said probability value for each said word candidate and the probability value of the corresponding at least one phoneme string according to a first predetermined function to obtain at least one combined probability value for each said word candidate;

(j) selecting one of said word candidates having the highest combined probability value;

(k) comparing said highest combined probability value to a second threshold value to determine a satisfactory level;

(l) if said highest combined probability value is equal to or greater than said second threshold value, accessing said first database to obtain said first information corresponding to the selected word candidate having the highest combined probability value; and (m) transmitting said first information to said user.

13. The method of claim 12, further comprising the steps of:

(n) if said highest combined probability value is less than said second threshold value, prompting said user to provide at least a partial spelling of said first response;

(o) transmitting a response including said spelling to means for recognizing individual letters of the alphabet to output word candidate data related to said spelling, said word candidate data having a probability value indicating a probability that said word candidate data is correct with respect to said spelling;

(p) comparing said probability value of said word candidate data output from the recognizing letters means to a third threshold value;

(q) if the probability value associated with said word candidate data from said recognizing letters means is equal to or greater than said third threshold value, accessing said first database to obtain the first information corresponding to said word candidate data.

14. The method of claim 13, further comprising steps of:

(r) if said probability value associated with said word candidate data output from said recognizing letters means is less than said third threshold value, prompting said user to input second alphabetic data via a keypad for transmission to a third database;

(s) accessing said first database to obtain second information corresponding to said second alphabetic data; and (t) transmitting said second information to said user.

15. The method of claim 12, wherein each said word candidate has a single corresponding phoneme string associated therewith, and said phoneme string is derived based upon phonetic spelling of said associated word candidate.

16. The method of claim 15, wherein each said phoneme string is derived based upon a plurality of pronunciations of said associated word candidate.

17. A method for automatically providing subscriber telephone numbers to telephone users over a telephone line, comprising the steps of:

(a) connecting a telephone user dialing a predetermined number to an automated directory assistance station;

(b) transmitting a first response from said user to a speech recognition device comprising means for recognizing a word from among a plurality of words and means for recognizing a phoneme string for association with a respective word;

(c) obtaining a first plurality of word candidates related to said first response from the word recognizing means and a first plurality of phoneme strings for each said word candidate from the phoneme recognizing means, each of said word candidates and each of said phoneme strings related thereto having probability values indicating a probability that said each word candidate and said each phoneme string are correct with respect to said first response, respectively;

(d) combining said probability value for said each word candidate with said each of said phoneme strings related thereto according to a first predetermined function to obtain a first plurality of combined probability values for said each word candidate;

(e) selecting one of said word candidates having the highest combined probability value;

(f) accessing a first database to obtain first information corresponding to said selected word candidate;

(g) instructing said user to provide a second response related to said first response;

(h) transmitting said second response to said speech recognition device;

(i) accessing said first database to obtain a plurality of second word candidates related to said second response, each of said second word candidates having a plurality of second phoneme strings related thereto, each of said second word candidates and said second phoneme strings having probability values indicating a probability that said each second word candidate and said each second phoneme string are correct with respect to said second response, respectively;

(j) combining said probability value for said each second word candidate with said each of said second phoneme strings related thereto according to said first predetermined function to obtain a second plurality of combined probability values for each said second word candidate;

(k) selecting one of said second word candidates having the highest combined probability of value of said second plurality;

(l) accessing said first database to obtain second information corresponding to the selected one of said second word candidates; and (m) transmitting said second information to said user.

18. The method of claim 17, wherein said first response is related to a location and said second response is related to the identity of a subscriber.

19. A method for automatically providing directory assistance information including a subscriber telephone number to a telephone user over a telephone line, comprising the steps of:

(a) connecting the telephone user to an automated directory assistance station;

(b) transmitting a first response from said user to means for recognizing speech, said speech recognizing means comprising means for recognizing a word from among a plurality of words;

(c) obtaining a plurality of word candidates related to said first response, each of said word candidates having a probability value indicating a probability that said each word candidate is correct with respect to said first response;

(d) comparing the probability values of said respective word candidates to a first threshold value;

(e) accessing a first database in response to identifying one of the word candidates having a probability value greater than or equal to a first threshold value, and obtaining first directory assistance information corresponding to the one identified word candidate;

(f) transmitting said first information to said user;

and wherein if none of said probability values is greater than or equal to said first threshold:

(g) obtaining at least one phoneme string associated with each said word candidate, said at least one phoneme string having a probability value indicating a probability that said at least one phoneme string is correct with respect to said first response;

(h) combining said probability value for said each word candidate with the probability value of the corresponding at least one phoneme string according to a first predetermined function to obtain at least one combined probability value for said each word candidate;

(i) selecting one of said word candidates having the highest combined probability value;

(j) comparing said highest combined probability value to a second threshold to determine a satisfactory level;

(k) if said highest combined probability value is greater than or equal to said second threshold, accessing said first database to obtain second directory assistance information corresponding to said selected word candidate; and (l) transmitting said second information to said user.

20. A method for automatically providing subscriber telephone numbers to telephone users over telephone line, comprising the steps of:

(a) connecting a telephone user to an automated directory assistance station;

(b) transmitting a first response from said user to means for recognizing speech, said means for recognizing speech comprising means for recognizing a word from among a plurality of words and means for recognizing a phoneme string for association with a respective word;

(c) obtaining a plurality of word candidates related to said first response, each of said word candidates having a probability value indicating a probability that said each word candidate is correct with respect to said first response;

(d) comparing the probability value of a first of the word candidates with a first threshold;

(e) if said probability value of said first of the word candidates is equal to or greater than said first threshold value, accessing a database to obtain first information corresponding to said first of the word candidates;

(f) instructing the user to provide a second response related to said first response;

(g) transmitting said second response to said means for recognizing speech;

(h) obtaining a plurality of secondary word candidates related to said second response, each of said secondary word candidates having a probability value indicating a probability that said each secondary word candidate is correct with respect to said second response, and obtaining at least one phoneme string associated with said each secondary word candidate, each said phoneme string having a probability value indicating a probability that said each phoneme is correct with respect to said second response;

(i) combining said probability value for said each secondary word candidate with the probability value of the corresponding at least one phoneme string according to a first predetermined function to obtain at least one combined probability value for said each word candidate;

(j) selecting one of said secondary word candidates having a highest combined probability value;

(k) comparing said highest combined probability value to a second threshold to determine a satisfactory level;

(l) if said highest combined probability value is equal to or greater than said second threshold value, accessing said database to obtain second information corresponding to the one secondary word candidate; and (m) transmitting said second information to said user.

21. An automated directory system for use in a telecommunications network connected to a plurality of telephone stations, comprising:

(a) means for recognizing a word spoken by a user from among a plurality of words, said recognizing means comprising means for generating a plurality of candidate words responsive to the spoken word, and means for assigning a probability value to each of the generated candidate words indicative of a probability that said each candidate word is correct with respect to said spoken word;

(b) means for recognizing phoneme string comprising means for generating a plurality of phoneme strings related to each of said candidate words, and means for generating a probability value for each said phoneme string indicative of a probability that said each phoneme string is correct with respect to said spoken word;

(c) means for combining the probability values of the phoneme strings with probability values of the respective candidate words to obtain a combined probability value for each said candidate word;

(d) comparison means for determining when one of the combined probability values is equal to or greater than a predetermined threshold value;

(e) a database containing information related to the plurality of word candidates; and (f) means for applying the candidate word corresponding to the one combined probability value to access said first database to obtain information to be sent to said user.

22. The system of claim 21, wherein said means for combining the probability values comprises means for correlating the phoneme strings corresponding to said each candidate word to combine the probability level of said each word candidate with the probability level of each of said corresponding phoneme strings to provide a plurality of combined probability values for said each word candidate.

23. A method for automatically providing directory assistance information including a subscriber telephone number to a telephone user, comprising:

connecting a telephone operated by the telephone user to a directory assistance station;

transmitting a first spoken input from the telephone user to a word recognition device and a phoneme recognition device;

in response to the first spoken input, outputting a plurality of word candidates from the word recognition device and a plurality of phoneme strings for each of the word candidates from the phoneme recognition device, each of the word candidates having a candidate probability value and each of the phoneme strings having a string probability value, each candidate probability value and string probability value indicating a probability that the corresponding word candidate and phoneme string is correct with respect to the first spoken input, respectively;

combining each candidate probability value, in accordance with a predetermined function, with the corresponding plurality of string probability values of the respective plurality of phoneme strings for said each word candidate to obtain a plurality of combined probability values for said each word candidate;

selecting one of the word candidates having a highest combined probability value; and accessing a database in response to the one word candidate to obtain the directory assistance information corresponding to the first spoken input.

24. The method of claim 23, further comprising determining if the highest combined probability value exceeds a threshold.

25. The method of claim 24, further comprising transmitting the directory assistance information if the highest combined probability value exceeds the threshold.

* * * * *